(12) United States Patent
Mera et al.

(10) Patent No.: US 8,271,767 B2
(45) Date of Patent: Sep. 18, 2012

(54) CONTROLLING ARITHMETIC PROCESSING ACCORDING TO ASYNCHRONOUS AND SYNCHRONOUS MODES BASED UPON DATA SIZE THRESHOLD

(75) Inventors: Keisuke Mera, Kanagawa (JP); Takeshi Ishihara, Kanagawa (JP); Yasuhiro Fukuju, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 376 days.

(21) Appl. No.: 12/147,897

(22) Filed: Jun. 27, 2008

(65) Prior Publication Data

US 2009/0006821 A1    Jan. 1, 2009

(30) Foreign Application Priority Data

Jun. 29, 2007 (JP) ................................. 2007-172081

(51) Int. Cl.
    *G06F 7/38* (2006.01)
(52) U.S. Cl. ........................ 712/229; 712/221
(58) Field of Classification Search .................. None
    See application file for complete search history.

(56) References Cited

U.S. PATENT DOCUMENTS

| | | | | |
|---|---|---|---|---|
| 5,812,768 A * | 9/1998 | Page et al. | ...................... | 709/228 |
| 6,144,667 A * | 11/2000 | Doshi et al. | ...................... | 370/401 |
| 6,178,464 B1 * | 1/2001 | Knight et al. | ................. | 719/328 |
| 6,219,711 B1 * | 4/2001 | Chari | ............................. | 709/232 |
| 7,136,976 B2 * | 11/2006 | Saika | ............................. | 711/162 |
| 7,260,703 B1 * | 8/2007 | Moore et al. | ..................... | 711/203 |
| 7,373,504 B1 * | 5/2008 | Belgaied et al. | .............. | 713/164 |
| 7,809,895 B2 * | 10/2010 | Spracklen et al. | ............ | 711/151 |
| 2003/0065709 A1 * | 4/2003 | Jordan et al. | .................. | 709/202 |
| 2003/0084093 A1 * | 5/2003 | Grason et al. | ................. | 709/203 |
| 2003/0187909 A1 * | 10/2003 | Le et al. | ........................ | 709/103 |
| 2004/0111461 A1 * | 6/2004 | Claudatos et al. | ............ | 709/200 |
| 2004/0184464 A1 * | 9/2004 | Holden | ..................... | 370/395.51 |
| 2005/0083917 A1 * | 4/2005 | Okamoto et al. | ............. | 370/352 |
| 2006/0026214 A1 * | 2/2006 | Berg et al. | ..................... | 707/201 |
| 2010/0324701 A1 * | 12/2010 | Nishimura | ...................... | 700/17 |

FOREIGN PATENT DOCUMENTS

| | | |
|---|---|---|
| JP | 2004-180253 | 6/2004 |
| JP | 2006-007638 | 1/2006 |

OTHER PUBLICATIONS

English Abstract of "Evaluation of hardware-based IPsec processing method for embedded devices"; Yasuhiro Fukuju, Keisuke Mera, Takeshi Ishihara, IEICE Tech Rep., vol. 107, No. 378, IN2007-112, pp. 79-84, Dec. 2007.*

Stefan (MATLAB Central)—Forum: MATLAB Newsreader, Forum topic: Intersection of 2 curves; relevant message posted Apr. 6, 2005; accessed at: http://www.mathworks.com/matlabcentral/newsreader/view_thread/92415 on Oct. 7, 2011.*

A.D. Keromytis, et al., The Design of the OpenBSD Cryptographic Framework, 2003 USENIX Annual Technical Conference, USENIX Association, 2003.

* cited by examiner

*Primary Examiner* — Keith Vicary

(74) *Attorney, Agent, or Firm* — Turocy & Watson, LLP

(57) ABSTRACT

An HW arithmetic unit executes a predetermined arithmetic operation. An arithmetic-mode determining unit determines, based on an attribute or a content of data relating to processing that has requested the arithmetic operation, either a synchronous mode that executes the processing after waiting for completion of the arithmetic operation by an arithmetic circuit or an asynchronous mode that executes the processing without waiting for completion of the arithmetic operation by the arithmetic circuit, as an execution mode of the arithmetic operation. An arithmetic-process control unit controls the arithmetic operation by the arithmetic circuit according to the determined execution mode.

4 Claims, 32 Drawing Sheets

FIG.3

| NO. | PROCESSING CONTENT | DATA SIZE [BYTE] | ARITHMETIC MODE | DATA READ ADDRESS | DATA WRITE ADDRESS |
|---|---|---|---|---|---|
| C101 | AES-CBC (ENCRYPTION) | 64 | SYNCHRONOUS | A01 | A02 |
| C102 | AES-CBC (ENCRYPTION) | 64 | ASYNCHRONOUS | A01 | A02 |
| C103 | AES-CBC (ENCRYPTION) | 128 | SYNCHRONOUS | A01 | A02 |
| C104 | AES-CBC (ENCRYPTION) | 128 | ASYNCHRONOUS | A01 | A02 |
| C105 | AES-CBC (ENCRYPTION) | 256 | SYNCHRONOUS | A01 | A02 |
| C106 | AES-CBC (ENCRYPTION) | 256 | ASYNCHRONOUS | A01 | A02 |
| C107 | AES-CBC (ENCRYPTION) | 512 | SYNCHRONOUS | A01 | A02 |
| C108 | AES-CBC (ENCRYPTION) | 512 | ASYNCHRONOUS | A01 | A02 |
| C109 | AES-CBC (ENCRYPTION) | 768 | SYNCHRONOUS | A01 | A02 |
| C110 | AES-CBC (ENCRYPTION) | 768 | ASYNCHRONOUS | A01 | A02 |
| C111 | AES-CBC (ENCRYPTION) | 1024 | SYNCHRONOUS | A01 | A02 |
| C112 | AES-CBC (ENCRYPTION) | 1024 | ASYNCHRONOUS | A01 | A02 |

FIG.4

| NO. | PROCESSING CONTENT | DATA SIZE [BYTE] | ARITHMETIC MODE | DATA READ ADDRESS | DATA WRITE ADDRESS |
|---|---|---|---|---|---|
| C201 | DES-CBC (ENCRYPTION) | 64 | SYNCHRONOUS | A01 | A02 |
| C202 | DES-CBC (ENCRYPTION) | 64 | ASYNCHRONOUS | A01 | A02 |
| C203 | DES-CBC (ENCRYPTION) | 128 | SYNCHRONOUS | A01 | A02 |
| C204 | DES-CBC (ENCRYPTION) | 128 | ASYNCHRONOUS | A01 | A02 |
| C205 | DES-CBC (ENCRYPTION) | 256 | SYNCHRONOUS | A01 | A02 |
| C206 | DES-CBC (ENCRYPTION) | 256 | ASYNCHRONOUS | A01 | A02 |
| C207 | DES-CBC (ENCRYPTION) | 512 | SYNCHRONOUS | A01 | A02 |
| C208 | DES-CBC (ENCRYPTION) | 512 | ASYNCHRONOUS | A01 | A02 |
| C209 | DES-CBC (ENCRYPTION) | 768 | SYNCHRONOUS | A01 | A02 |
| C210 | DES-CBC (ENCRYPTION) | 768 | ASYNCHRONOUS | A01 | A02 |
| C211 | DES-CBC (ENCRYPTION) | 1024 | SYNCHRONOUS | A01 | A02 |
| C212 | DES-CBC (ENCRYPTION) | 1024 | ASYNCHRONOUS | A01 | A02 |

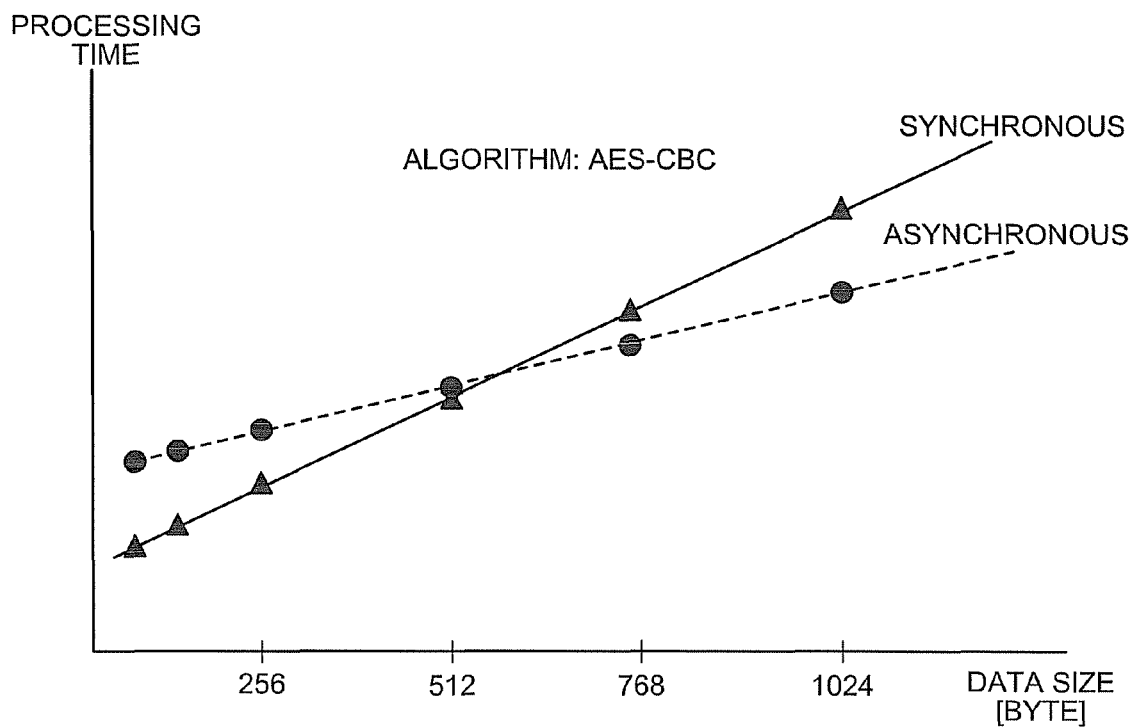

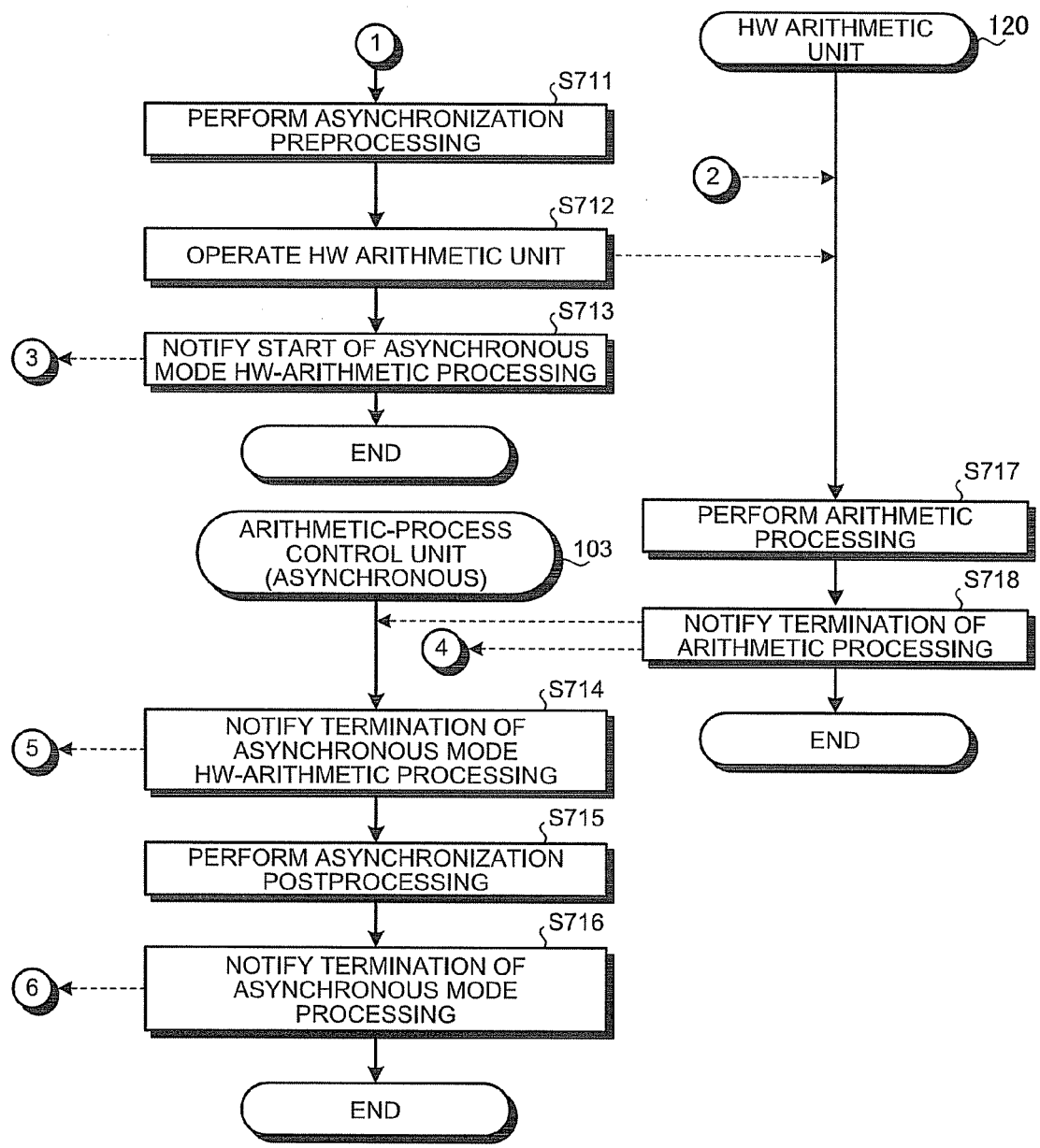

FIG.11

| NO. | PROCESSING CONTENT | DATA SIZE [BYTE] | ARITHMETIC MODE | DATA READ ADDRESS | DATA WRITE ADDRESS |
|---|---|---|---|---|---|
| C301 | AES-CBC (ENCRYPTION) | 64 | SW | A01 | A02 |
| C302 | AES-CBC (ENCRYPTION) | 64 | HW SYNCHRONOUS | A01 | A02 |
| C303 | AES-CBC (ENCRYPTION) | 64 | HW ASYNCHRONOUS | A01 | A02 |
| C304 | AES-CBC (ENCRYPTION) | 128 | SW | A01 | A02 |
| C305 | AES-CBC (ENCRYPTION) | 128 | HW SYNCHRONOUS | A01 | A02 |
| C306 | AES-CBC (ENCRYPTION) | 128 | HW ASYNCHRONOUS | A01 | A02 |
| C307 | AES-CBC (ENCRYPTION) | 256 | SW | A01 | A02 |
| C308 | AES-CBC (ENCRYPTION) | 256 | HW SYNCHRONOUS | A01 | A02 |
| C309 | AES-CBC (ENCRYPTION) | 256 | HW ASYNCHRONOUS | A01 | A02 |
| C310 | AES-CBC (ENCRYPTION) | 512 | SW | A01 | A02 |
| C311 | AES-CBC (ENCRYPTION) | 512 | HW SYNCHRONOUS | A01 | A02 |
| C312 | AES-CBC (ENCRYPTION) | 512 | HW ASYNCHRONOUS | A01 | A02 |
| C313 | AES-CBC (ENCRYPTION) | 768 | SW | A01 | A02 |
| C314 | AES-CBC (ENCRYPTION) | 768 | HW SYNCHRONOUS | A01 | A02 |
| C315 | AES-CBC (ENCRYPTION) | 768 | HW ASYNCHRONOUS | A01 | A02 |
| C316 | AES-CBC (ENCRYPTION) | 1024 | SW | A01 | A02 |
| C317 | AES-CBC (ENCRYPTION) | 1024 | HW SYNCHRONOUS | A01 | A02 |
| C318 | AES-CBC (ENCRYPTION) | 1024 | HW ASYNCHRONOUS | A01 | A02 |

FIG.12

| NO. | PROCESSING CONTENT | DATA SIZE [BYTE] | ARITHMETIC MODE | DATA READ ADDRESS | DATA WRITE ADDRESS |
|---|---|---|---|---|---|
| C301 | DES-CBC (ENCRYPTION) | 64 | SW | A01 | A02 |
| C302 | DES-CBC (ENCRYPTION) | 64 | HW SYNCHRONOUS | A01 | A02 |
| C303 | DES-CBC (ENCRYPTION) | 64 | HW ASYNCHRONOUS | A01 | A02 |
| C304 | DES-CBC (ENCRYPTION) | 128 | SW | A01 | A02 |
| C305 | DES-CBC (ENCRYPTION) | 128 | HW SYNCHRONOUS | A01 | A02 |
| C306 | DES-CBC (ENCRYPTION) | 128 | HW ASYNCHRONOUS | A01 | A02 |
| C307 | DES-CBC (ENCRYPTION) | 256 | SW | A01 | A02 |
| C308 | DES-CBC (ENCRYPTION) | 256 | HW SYNCHRONOUS | A01 | A02 |
| C309 | DES-CBC (ENCRYPTION) | 256 | HW ASYNCHRONOUS | A01 | A02 |
| C310 | DES-CBC (ENCRYPTION) | 512 | SW | A01 | A02 |
| C311 | DES-CBC (ENCRYPTION) | 512 | HW SYNCHRONOUS | A01 | A02 |
| C312 | DES-CBC (ENCRYPTION) | 512 | HW ASYNCHRONOUS | A01 | A02 |
| C313 | DES-CBC (ENCRYPTION) | 768 | SW | A01 | A02 |
| C314 | DES-CBC (ENCRYPTION) | 768 | HW SYNCHRONOUS | A01 | A02 |
| C315 | DES-CBC (ENCRYPTION) | 768 | HW ASYNCHRONOUS | A01 | A02 |
| C316 | DES-CBC (ENCRYPTION) | 1024 | SW | A01 | A02 |
| C317 | DES-CBC (ENCRYPTION) | 1024 | HW SYNCHRONOUS | A01 | A02 |
| C318 | DES-CBC (ENCRYPTION) | 1024 | HW ASYNCHRONOUS | A01 | A02 |

| PROCESSING CONTENT | SWITCHING CONTENT | DATA SIZE THRESHOLD VALUE [BYTE] |
|---|---|---|
| AES-CBC (ENCRYPTION) | SW-SYNC | 300 |
| AES-CBC (ENCRYPTION) | SYNC-ASYNC | 800 |
| DES-CBC (ENCRYPTION) | SW-SYNC | 400 |
| DES-CBC (ENCRYPTION) | SYNC-ASYNC | 900 |
| ... | ... | ... |

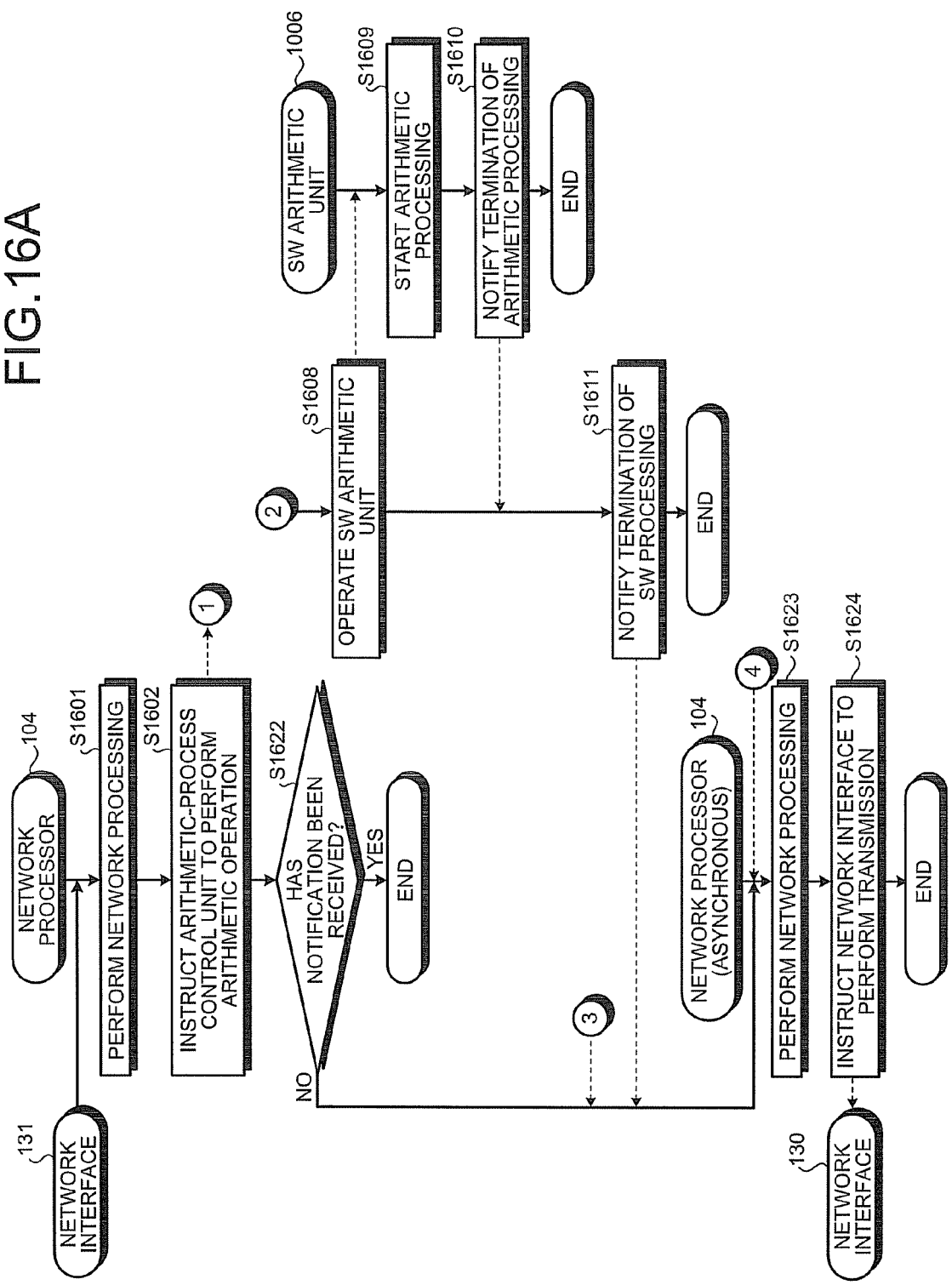

SIP/2.0 200 OK ⌒1901
Via: SIP/2.0/UDP example.com:8060;branch=z9hG4bKaaaaaa
From: phone1 <sip:phone1@example.com>;tag=abcdefg
To: phone2 <sip:phone2@example.com>;tag=1234567 ⌒1902
Call-ID: 10000001@example.com ⌒1903
Cseq: 1 INVITE ⌒1904
Contact: <sip:phone2@192.168.102.2>
Content-Type: application/sdp
Content-Length: 153 v=0
o= phone1 1169102700 1169102700 IN IP4 example.com
s=Voice session
c=IN IP4 192.168.102.1
t=0 0 ⌒1905
m=audio 43210 RTP/AVP 18 0 4 96
a=rtpmap:0 PCMU/8000 ⌒1906

| NO. | L3 PROTO | SRC IP | DST IP | L4 PROTO | SRC PORT | DSC PORT | UPPER INFO. |
|---|---|---|---|---|---|---|---|
| 1 | IPv4 | 192.168.101.1 | 192.168.102.1 | UDP | * | * | RTP |
| 2 | IPv4 | 192.168.102.1 | 192.168.101.2 | UDP | * | * | RTP |
| 3 | IPv6 | 2001:db8::1 | 2001:db8::2 | TCP | P3 | 23 | – |
| ... | ... | ... | ... | ... | ... | ... | ... |

| NO. | BIT RATE | ALLOWABLE DELAY |
|---|---|---|
| 1 | 4 Mbps | 5 s |
| 2 | 512 Kbps | 100 ms |
| ... | ... | ... |

| NO. | APPLICATION |
|-----|-------------|
| 1 | SOFTPHONE |
| 2 | VIDEO CHAT |
| 3 | TELNET |
| ... | ... |

CONTROLLING ARITHMETIC PROCESSING ACCORDING TO ASYNCHRONOUS AND SYNCHRONOUS MODES BASED UPON DATA SIZE THRESHOLD

CROSS-REFERENCE TO RELATED APPLICATIONS

This application is based upon and claims the benefit of priority from the prior Japanese Patent Application No. 2007-172081, filed on Jun. 29, 2007; the entire contents of which are incorporated herein by reference.

BACKGROUND OF THE INVENTION

1. Field of the Invention

The present invention relates to an apparatus, a method, and a computer program product for processing information by controlling hardware arithmetic processing according to asynchronous and synchronous mode that can reduce a load on a processor unit.

2. Description of the Related Art

Recently, a broadband network has been popularized in government agencies, corporations, education institutions, and homes, and there is growing interest in network security for preventing information leakage and data falsification. For communication data transferred via a communication line, tapping and falsification can be prevented by using cryptographic technology and message authentication (digest authentication, hash authentication, keyed-hashing for message authentication code (HMAC) authentication), thereby enabling to improve the security.

Representative communication protocols for improving the security of the communication data include IPsec and Transport Layer Security (TLS) specified by the Internet Engineering Task Force (IETF) and the Wired Equivalent Privacy (WEP) specified by the Institute of Electrical and Electronics Engineers, Inc. (IEEE). Further, the cryptographic technology is used for preventing illegal copying of literary works and preventing illegal outflow of personal information, business confidential information, and confidential information involved with national defense.

Recently, further, high-definition and high-quality digital broadcasting and digital music distribution are popularized. For various digital data such as digital speech data, image data, and video data, reduction of data amount to be stored and reduction of data transfer capacity per unit time of the communication line can be realized by using a data compression technique. Particularly, because data amount is increasing due to high definition of the image data and the video data, the compression technique becomes essential.

Representative compression techniques of digital image data and digital video data include Joint Photographic Experts Group (JPEG) and Moving Picture Experts Group (MPEG)$^{(registered\ trademark)}$. Representative compression techniques of digital speech data include Advanced Audio Coding (AAC)$^{(registered\ trademark)}$, MPEG-1 for Audio Layer-3 (MP3), and Adaptive Transform Acoustic Coding (ATRAC)$^{(registered\ trademark)}$.

Arithmetic processing such as encryption and data compression processing is realized in many cases by executing a sequence of instruction (program) on a general-purpose processing unit (PU) equipped in a general-purpose computer. According to this method, however, the data amount to be processed per unit time increases with an increase in the data amount and communication data rate, to increase a load on the arithmetic processing performed on the general-purpose PU.

With respect to such a problem, the arithmetic processing load on the PU can be reduced by installing an apparatus that performs specific arithmetic processing (hereinafter, "HW arithmetic unit") in addition to the general-purpose PU in the general-purpose computer. Thus, execution of the arithmetic processing by the HW arithmetic unit is frequently referred to as hardware offloading or hardware arithmetic processing.

Regarding the hardware arithmetic processing, JP-A 2006-7638 (KOKAI) and JP-A 2004-180253 (KOKAI) disclose a technique for changing over software arithmetic processing and hardware arithmetic processing, to execute the arithmetic processing such as the encryption processing and the data compression processing by either the HW arithmetic unit or the PU, whichever is faster.

On the other hand, the method of controlling the HW arithmetic unit from the program operating on the general-purpose PU can be divided into the synchronous mode and the asynchronous mode. In the synchronous mode, processing for waiting for termination of the processing by the HW arithmetic unit (hereinafter, "HW operation-termination waiting processing") is performed, when the arithmetic processing is requested from the program operating on the general-purpose PU to the HW arithmetic unit. The synchronous mode is mainly adopted by a program for performing the arithmetic processing by the HW arithmetic unit.

In the asynchronous mode, software processing is divided into processing up to the hardware arithmetic processing (hereinafter, "preprocessing") and processing after the hardware arithmetic processing (hereinafter, "postprocessing") and executed, without waiting for the termination of the processing by the HW arithmetic unit. In the asynchronous mode, because the processing is divided before and after the hardware arithmetic processing and executed, processing for passing data held by the preprocessing (example: parameters relating to the hardware arithmetic processing and data subjected to the hardware arithmetic processing) on to the postprocessing (hereinafter, "asynchronous processing") is required. As an example of the asynchronous processing, there is an operation for passing all or a part of the data held by the preprocessing on to the postprocessing, or an operation for passing a memory address of all or a part of the data held by the preprocessing on to the postprocessing.

In A. D. Keromytis et al., "The Design of the OpenBSD Cryptographic Framework", 2003 USENIX Annual Technical Conference, USENIX Association, 2003, a program for controlling the HW arithmetic unit that performs encryption and decryption according to the asynchronous mode is described. Currently, however, examples adopting the asynchronous mode are fewer than examples adopting the synchronous mode.

According to the asynchronous mode, termination of the processing by the HW arithmetic unit need not be waited for as in the synchronous mode. Therefore, the load on the PU during the arithmetic processing by the HW arithmetic unit can be reduced as compared to that in the synchronous mode. Accordingly, when the asynchronous mode can be adopted, generally, the HW arithmetic unit is controlled only according to the asynchronous mode.

Depending on the type of the arithmetic processing, however, control of the HW arithmetic unit according to the asynchronous mode can be unsuitable. For example, when the load on the PU in the asynchronous processing according to the asynchronous mode is higher than the load on the PU in the HW operation termination waiting processing according to the synchronous mode, the load on the PU can be reduced further by controlling the HW arithmetic unit according to the synchronous mode. That is, there is a problem that even in an apparatus designed to control the HW arithmetic unit according to the asynchronous mode to reduce the load on the PU, the load on the PU can be increased on the contrary.

Further, in the case of the asynchronous mode, processing delay higher than that in the synchronous mode occurs by the time required for performing the asynchronous processing. In the asynchronous mode, because the processing is divided before and after the hardware arithmetic processing, time fluctuation until the postprocessing is executed on the PU is larger than that in the synchronous mode. Therefore, in the asynchronous mode, there is a problem that an increase of the processing delay and fluctuation (jitter) of the processing delay occur, and therefore the asynchronous mode is not suitable for the processing requiring real-time performance.

SUMMARY OF THE INVENTION

According to one aspect of the present invention, an information processing apparatus includes an arithmetic circuit that executes a predetermined arithmetic operation; a determining unit that determines either a synchronous mode or an asynchronous mode as an execution mode of the arithmetic operation based on an attribute or a content of data relating to processing requesting the arithmetic operation, the synchronous mode executing the processing after waiting for completion of the arithmetic operation by the arithmetic circuit, and the asynchronous mode executing the processing without waiting for completion of the arithmetic operation by the arithmetic circuit; and a control unit that controls the arithmetic operation performed by the arithmetic circuit according to the execution mode determined by the determining unit.

According to another aspect of the present invention, an information processing method includes determining either a synchronous mode or an asynchronous mode as an execution mode of the arithmetic operation based on an attribute or a content of data relating to processing requesting a predetermined arithmetic operation to be executed by an arithmetic circuit, the synchronous mode executing the processing after waiting for completion of the arithmetic operation by the arithmetic circuit, and the asynchronous mode executing the processing without waiting for completion of the arithmetic operation by the arithmetic circuit; and controlling the arithmetic operation performed by the arithmetic circuit according to the determined execution mode.

A computer program product according to still another aspect of the present invention causes a computer to perform the method according to the present invention.

BRIEF DESCRIPTION OF THE DRAWINGS

FIG. 3 is a schematic diagram for explaining a test sheet example in the first embodiment;

FIG. 4 is a schematic diagram for explaining the test sheet example in the first embodiment;

FIG. 5 is a graph representing a relation between a data size and a processing time in the first embodiment;

FIG. 6 is a schematic diagram for explaining one example of a storage format of a data size threshold value in the first embodiment;

FIGS. 7A and 7B are flowcharts of an overall flow of a data-size-threshold calculation process in the first embodiment;

FIG. 11 is a schematic diagram for explaining a test sheet example in the second embodiment;

FIG. 12 is a schematic diagram for explaining the test sheet example in the second embodiment;

FIGS. 16A and 16B are flowcharts of an overall flow of communication processing in the second embodiment;

DETAILED DESCRIPTION OF THE INVENTION

Exemplary embodiments of an apparatus, a method, and a computer program product for processing information according to the present invention will be explained below in detail with reference to the accompanying drawings.

An information processing apparatus according to a first embodiment of the present invention executes encryption processing by hardware, by adopting either a synchronous mode or an asynchronous mode depending on an attribute of data to be encrypted (data size). In the first embodiment, an example using a communication apparatus that performs communication processing according to an IPsec protocol is explained as one example of the information processing apparatus. However, an applicable apparatus is not limited to the communication apparatus that executes the communication processing in this manner, and any apparatus can be applied so long as the apparatus has a function of executing a specific operation such as encryption processing and data compression processing by the hardware.

Figure 1:
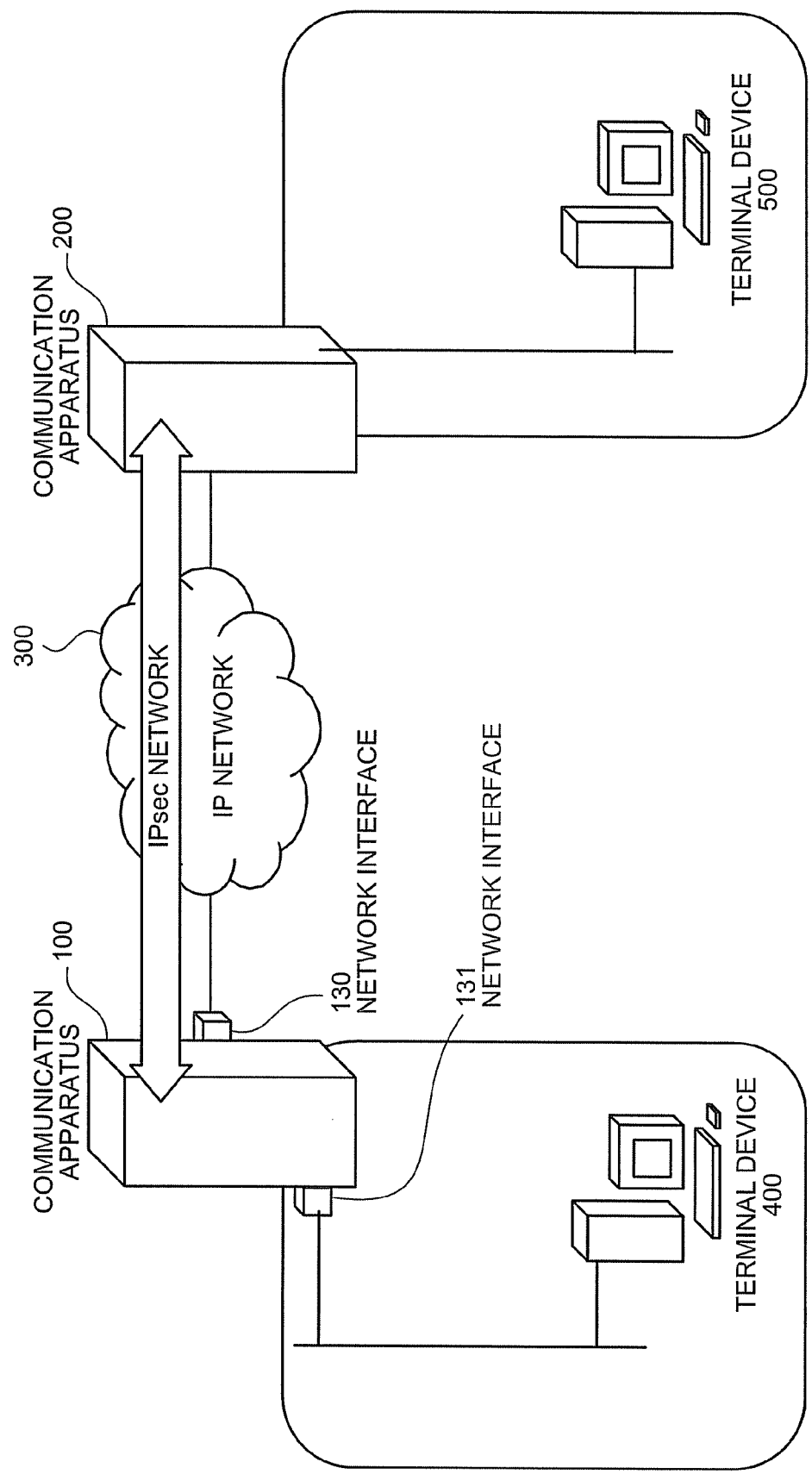
FIG. 1 is a network configuration diagram of a communication system according to a first embodiment of the present invention.

As shown in FIG. 1, in a communication system in the first embodiment, a communication apparatus 100 and a communication apparatus 200 as a communication partner are connected with each other by an IP network 300. The communication apparatuses 100 and 200 are respectively connected to terminal devices 400 and 500.

The communication apparatus 100 performs packet processing and data processing in connection with the IPsec protocol, and includes a function of executing the encryption processing and the like by the hardware. As shown in FIG. 1, the communication apparatus 100 is connected to the IP network 300 and the terminal device 400, respectively, via network interfaces 130 and 131.

The communication apparatus 200 communicates with the communication apparatus 100 according to the IPsec protocol. The terminal devices 400 and 500 respectively transfer data via the communication apparatuses 100 and 200.

Figure 2:
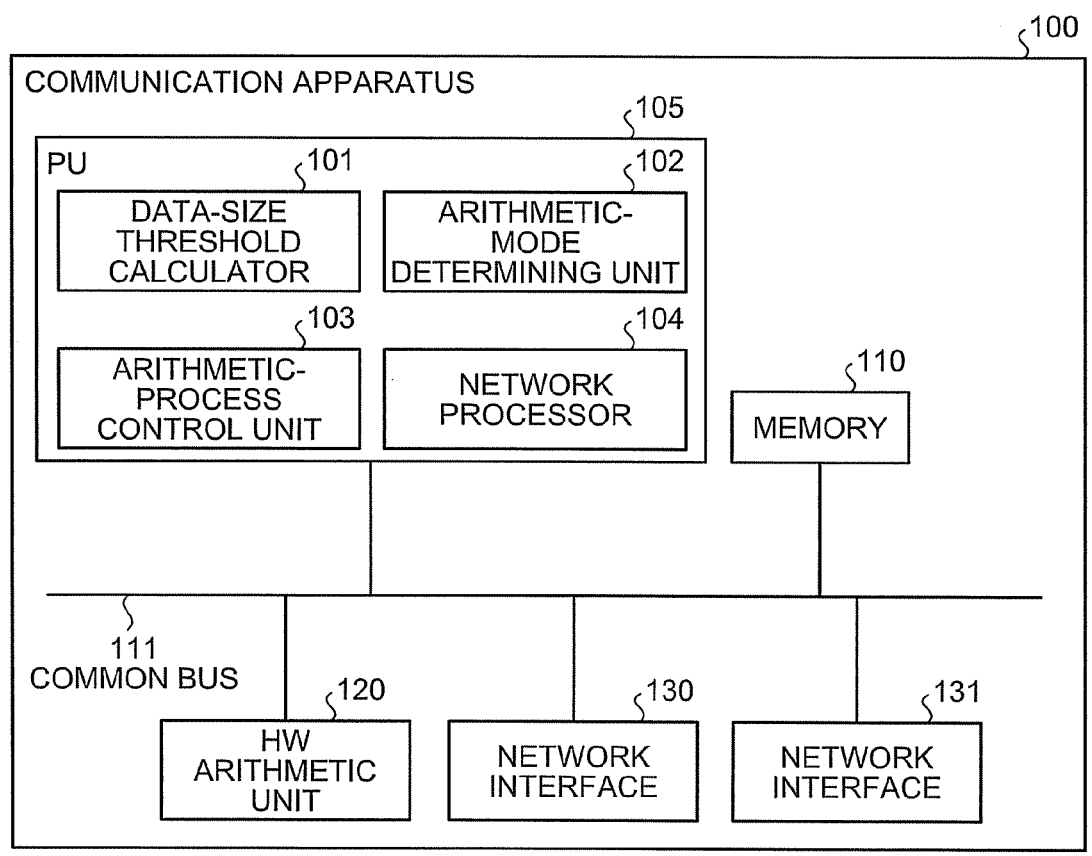
FIG. 2 is a block diagram of a configuration of a communication apparatus according to the first embodiment.

A detailed configuration of the communication apparatus 100 is explained next with reference to FIG. 2. As shown in FIG. 2, the communication apparatus 100 includes a PU 105, an HW arithmetic unit 120, a memory 110, and the network interfaces 130 and 131, as the main hardware configuration.

All these units are connected to a common bus 111, and data is inter-transferred via the common bus 111. The network interfaces 130 and 131 are described for indicating an example of the first embodiment, and network interfaces need not installed when the communication is not required. The number of the network interfaces is not limited to two, and one or more than three network interfaces can be installed according to the processing content or the like.

The HW arithmetic unit 120 is an arithmetic circuit that performs a specific arithmetic operation such as encryption/decryption, data compression/expansion by the hardware. For example, the HW arithmetic unit 120 can be configured by a device such as a digital signal processor (DSP) or an application specific integrated circuit (ASIC) exclusively made for performing the specific arithmetic processing or a programmable device that constitutes a circuit by loading a sequence of instruction of the specific arithmetic processing from a storage unit.

The memory 110 is a storage unit such as a random access memory (RAM) that stores the sequence of instruction involved with the data processing and the data to be processed, when the PU 105 performs data processing. The memory 110 is not limited to the RAM, and it can be configured by any generally used storage media such as a memory card, an optical disk, and a hard disk drive (HDD).

The network interfaces 130 and 131 are used by the communication apparatus 100 to transfer the data between an external device and the communication apparatus 100. The network interfaces 130 and 131 can be formed of any generally used interface such as a wire communication interface such as the Ethernet[registered trademark], the Integrated Services Digital Network (ISDN)[registered trademark], and a FAX modem, or a radio communication interface such as the Wireless Fidelity (WiFi)[registered trademark]) (wireless LAN) and a mobile phone.

The common bus 111 is a communication channel for electromagnetically or optically transferring the data between the devices such as the PU 105 and the memory 110.

The PU 105 executes respective tasks in connection with a data-size threshold calculator 101, an arithmetic-mode determining unit 102, an arithmetic-process control unit 103, and a network processor 104, which are the main software configuration.

The data-size threshold calculator 101 calculates beforehand a data size threshold value, which is a criterion when the arithmetic-mode determining unit 102 determines which of the synchronous mode and the asynchronous mode is to be selected in the processing of the HW arithmetic unit 120, before the actual data processing. A data-size-threshold calculation process includes a step of measuring processing time at the time of selecting the synchronous mode, a step of measuring the processing time at the time of selecting the asynchronous mode, and a step of calculating the threshold value by using the measurement results of the synchronous mode and the asynchronous mode.

In the measurement step of the processing time, the data-size threshold calculator 101 uses a test sheet in which data and conditions are preset. FIGS. 3 and 4 are schematic diagrams for explaining a test sheet example for measuring the processing time in the first embodiment. FIGS. 3 and 4 are examples when the HW arithmetic unit 120 performs the encryption processing.

As shown in FIGS. 3 and 4, the test sheet includes identification information (No.), processing content indicating a content of the arithmetic processing, data size of data used for the measurement, arithmetic mode (synchronous or asynchronous), data read address, and data write address. "AES-CBC (encryption)" in the processing content means to perform the encryption processing in a cipher block chaining (CBC) mode in an Advanced Encryption Standard (AES) system. "DES-CBC (encryption)" means to perform the encryption processing in the cipher block chaining (CBC) mode in a Data Encryption Standard (DES) system.

In FIGS. 3 and 4, division of the data size is set to from 64 to 256 bytes, however, more finely divided data can be used, or more roughly divided data can be used. However, when the data is divided roughly, because there is high possibility that the accuracy of the obtained data size threshold value decreases, it is desired to divide the data as fine as possible.

The data size of the test sheet can be dynamically determined by using a Newton's method or the like, to efficiently reduce the number of tests to be executed. For the data read address and the data write address, the same address can be used through all the trials or different addresses can be used. When different addresses are used, it is required to set such that the processing speed in the HW arithmetic unit 120 does not change because of the data to be processed being different. For example, when the HW arithmetic unit 120 performs the processing involved with data compression, if entropy of the data to be processed is different, there is high possibility that the processing speed in the HW arithmetic unit 120 changes. Accordingly, it is desired to use the same data for the same processing content in the test.

In the examples shown in FIGS. 3 and 4, the AES-CBC (encryption) and the DES-CBC (encryption) are explained; however, other algorithms or decryption processing can be included. When the HW arithmetic unit 120 carries out an operation such as data compression or expansion algorithm other than the encryption/decryption processing, the content thereof can be set in the processing content.

An outline of the threshold value calculation processing using the measurement result is explained next with reference to FIG. 5. FIG. 5 is a graph representing a relation between the data size and the processing time for each arithmetic mode measured according to the test sheet. FIG. 5 is an example of a relation between the data size and the processing time for each of the synchronous mode and the asynchronous mode, when the "AES-CBC (encryption)" is specified as the processing content.

The data-size threshold calculator 101 determines the data size corresponding to a node of lines connecting the processing time in the respective arithmetic modes obtained as shown in FIG. 5 as the data size threshold value. The details of the data-size-threshold calculation process are described later.

The data-size threshold calculator 101 stores the calculated data size threshold value in the storage unit such as the memory 110.

As shown in FIG. 6, the data size threshold value is calculated for each of the processing contents instructed in the test sheet. FIG. 6 is an example in which 700 bytes is calculated as the data size threshold value when the processing content indicates "AES-CBC (encryption)", and 800 bytes is calculated as the data size threshold value when the processing content indicates "DES-CBC (encryption)". The storage format is not limited to a table format as shown in FIG. 6.

Returning to FIG. 2, the arithmetic-mode determining unit 102 compares the criterion (data size threshold value) calculated by the data-size threshold calculator 101 with the data size of the data to be processed passed on from the arithmetic-process control unit 103, to thereby determine either the synchronous mode or the asynchronous mode as an arithmetic execution method (hereinafter, "arithmetic method") by the HW arithmetic unit 120.

The arithmetic-process control unit 103 controls execution of a specific arithmetic processing such as encryption/decryption or data compression/expansion by the HW arithmetic unit 120. Specifically, the arithmetic-process control unit 103 receives parameters involved with the arithmetic operation from the network processor 104, and instructs the HW arithmetic unit 120 to perform processing according to the received parameters. The arithmetic-process control unit 103 receives, for example, the processing algorithm, memory storage area of the data to be processed, and the data size to be processed as the parameters.

The network processor 104 is a main part that executes the processing of an application and the system, and uses the arithmetic-process control unit 103 to make the HW arithmetic unit 120 execute a part or all of the processing. Because the first embodiment is an example of communication processing, the network processor 104 performs various types of processing for transferring data between the communication apparatus 100 and the external device. For example, the network processor 104 performs analysis of a header of the data (packet) received from the network interface 130 and communication protocol processing, and creation of the header of the data (packet) and communication protocol processing for transmitting the data from the network interfaces 130 and 131.

The communication apparatus 100 can be configured such that at least two of the PU 105, the memory 110, and the HW arithmetic unit 120 are mounted on a semiconductor device such as a system on chip (SoC).

A flow in various types of processing by the communication apparatus 100 according to the first embodiment configured in this manner is explained next. The processing by the communication apparatus 100 can be divided into the data-size-threshold calculation process executed beforehand and communication processing as the main data processing. The communication processing means processing for transferring data via the IP network 300 between the communication apparatus 100 and the communication apparatus 200 as another apparatus.

Figure 7A:
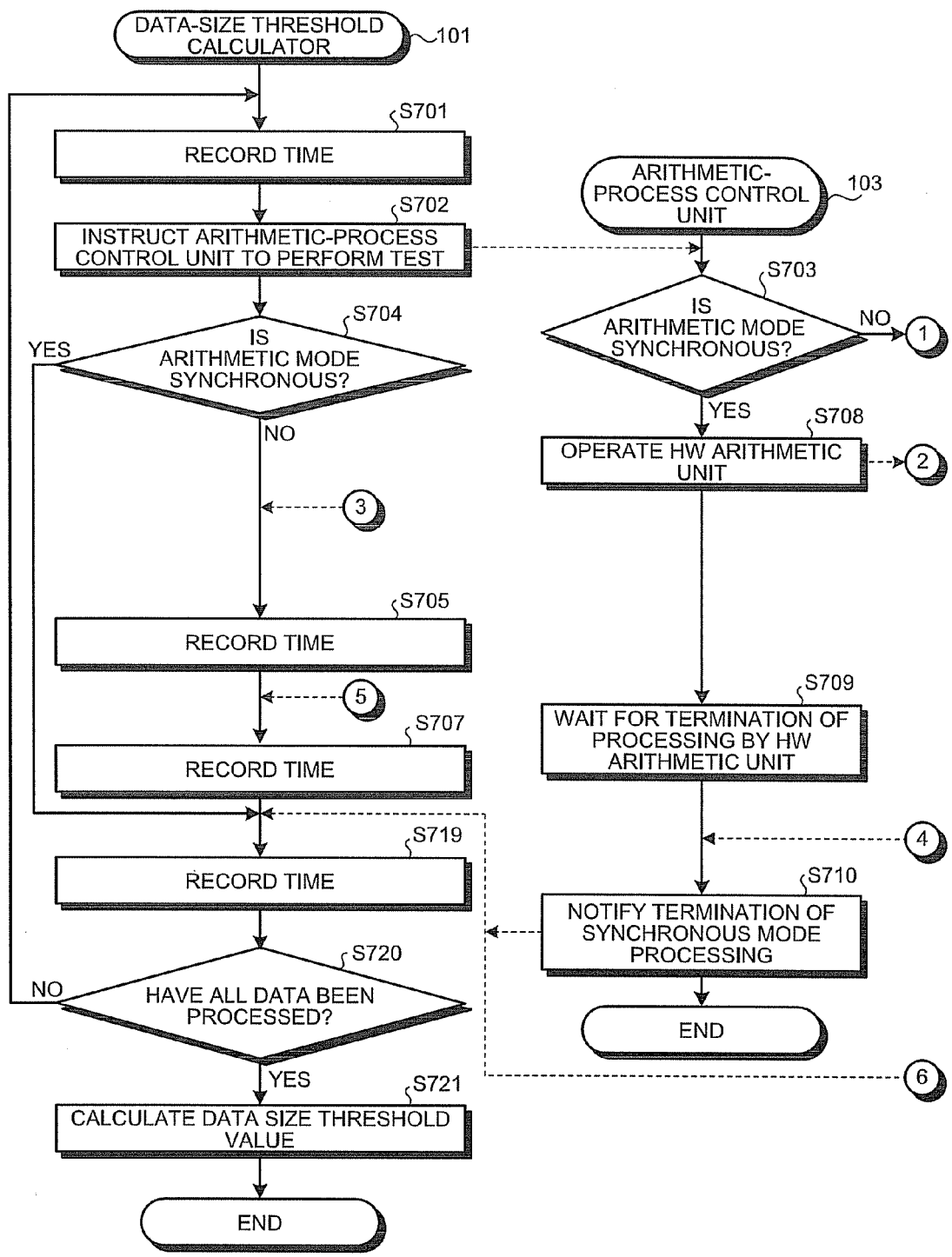

The data-size-threshold calculation process is explained first with reference to FIGS. 7A and 7B.

First, the data-size threshold calculator 101 records the current time in the memory 110 or the like (step S701). For sake of simplicity, the time recorded at this step is referred to as time Tsync1 in the case of the synchronous mode, and time Tasync1 in the case of the asynchronous mode.

The data-size threshold calculator 101 then instructs the arithmetic-process control unit 103 to perform a test (step S702). At this time, the data-size threshold calculator 101 instructs execution of the test according to the test sheet as shown in FIG. 3 or FIG. 4.

The arithmetic-process control unit 103 having received the instruction determines whether the arithmetic mode of the test sheet is synchronous or asynchronous (step S703). For example, when execution of No.=C101 in the test sheet shown in FIG. 3 is instructed, the arithmetic-process control unit 103 determines that the arithmetic mode is "synchronous". For example, when execution of No.=C102 in the test sheet shown in FIG. 3 is instructed, the arithmetic-process control unit 103 determines that the arithmetic mode is "asynchronous".

When the arithmetic mode is synchronous (YES at step S703), the arithmetic-process control unit 103 operates the HW arithmetic unit 120 so that the HW arithmetic unit 120 starts the arithmetic operation according to the processing content in the test sheet (step S708). The arithmetic-process control unit 103 waits for termination of the processing by the HW arithmetic unit 120 (step S709).

Upon reception of a termination notification of the arithmetic processing from the HW arithmetic unit 120, the arithmetic-process control unit 103 notifies the data-size threshold calculator 101 of termination of the process according to the synchronous mode (step S710), to finish the process.

At step S703, when it is determined that the arithmetic mode is asynchronous (NO at step S703), the arithmetic-process control unit 103 executes the asynchronization preprocessing such as storing of the processing state (step S711). The arithmetic-process control unit 103 operates the HW arithmetic unit 120 so that the HW arithmetic unit 120 starts the arithmetic operation according to the processing content in the test sheet (step S712). Because the arithmetic mode is the asynchronous mode, the arithmetic-process control unit 103 notifies the data-size threshold calculator 101 of the start of the HW arithmetic processing according to the asynchronous mode, to finish the process (step S713).

Thereafter, upon reception of a termination notification of the arithmetic process from the HW arithmetic unit 120, the arithmetic-process control unit 103 notifies the data-size threshold calculator 101 of termination of the HW arithmetic processing according to the asynchronous mode (step S714). The arithmetic-process control unit 103 then executes the asynchronization postprocessing such as reloading operation of the stored processing state (step S715). When the postprocessing is complete, the arithmetic-process control unit 103 notifies the data-size threshold calculator 101 of termination of the process according to the asynchronous mode (step S716), to finish the process.

At step S708 or step S712, the HW arithmetic unit 120, which is operated to start the arithmetic operation by the arithmetic-process control unit 103, executes the arithmetic processing according to the instructed processing content (step S717). For example, when execution of No.=C101 or C102 in the test sheet shown in FIG. 3 is instructed, the HW arithmetic unit 120 performs encryption in which the algorithm is the AES-CBC mode with respect to the data for 64 bytes from address A01 on the memory 110, and writes processing result data in an area for 64 bytes from address A02 on the memory 110.

When the arithmetic processing is complete, the HW arithmetic unit 120 notifies the arithmetic-process control unit 103 of the termination of the arithmetic processing (step S718), to finish the process.

After instructing the test at step S702, the data-size threshold calculator 101 determines which of the synchronous mode or the asynchronous mode is to be used as the arithmetic mode of the instructed test (step S704). In the case of the asynchronous mode (NO at step S704), the data-size threshold calculator 101 records time Tasync2 at a point in time when the start notification of the HW arithmetic processing is received from the arithmetic-process control unit 103 (step S705). Further, the data-size threshold calculator 101 records time Tasync3 at a point in time when the termination notification of the HW arithmetic processing is received from the arithmetic-process control unit 103 (step S707).

After recording the time Tasync3, or when it is determined that the arithmetic mode is the synchronous mode at step S704 (YES at step S704), the data-size threshold calculator 101 records the time at a point in time when the termination notification of the processing is received from the arithmetic-process control unit 103 (step S719). For sake of simplicity, the time recorded at this step is referred to as time Tsync2 in the case of the synchronous mode, and time Tasync4 in the case of the asynchronous mode.

The data-size threshold calculator 101 then determines whether all the data in the test sheet have been processed (step S720), and when all the data have not been processed (NO at step S720), the processing is repeated with respect to the next data (step S701).

Thus, the data-size threshold calculator 101 can record the time for determining the processing time of the arithmetic processing according to the respective arithmetic modes for each of the data having a different data size. Each time is recorded in association with the number "No." in the test sheet.

When all the data is processed (YES at step S720), the data-size threshold calculator 101 calculates the data size threshold value based on the recorded each time (step S721).

Details of a procedure for determining the data size threshold value from the time are explained here. The data-size threshold calculator 101 first calculates the processing time for each arithmetic mode from the recorded time. The data-size threshold calculator 101 calculates the processing time Tsync according to the synchronous mode and the processing time Tasync according to the asynchronous mode according to the following equation (1), (2), respectively.

$$Tsync = Tsync2 - Tsync1 \quad (1)$$

$$Tasync = (Tasync2 - Tasync1) + (Tasync4 - Tasync3) \quad (2)$$

FIG. 5 is an example of the processing time for each arithmetic mode calculated in this manner. In this example, magnitude relation between the values of Tsync and Tasync is reversed between 512 bytes and 768 bytes. The data-size threshold calculator 101 determines the data size at which the magnitude relation is reversed as the data size threshold value involved with the processing content. The thus obtained data size threshold value is expressed as SIZE (processing content). For example, when the threshold value obtained with respect to the processing content="AES-CBC (encryption)" is 700 bytes, the data size threshold value is expressed as SIZE (AES-CBC (encryption))=700 bytes.

The data-size threshold calculator 101 performs function fitting according to a method of least squares or the like with respect to respective modes of Tsync and Tasync discretely obtained, to calculate the data size at the node of the functions as the data size threshold value.

The calculation method of the data size threshold value is not limited thereto, and various methods can be applied, such as a method in which the data size having the smallest difference between Tasync and Tsync is selected as the data size threshold value from the discretely obtained values, and a method of determining the threshold value by using a value of difference between Tasync and Tsync weighted by data at the opposite ends of the data size at the node.

The data-size threshold calculator 101 executes the data-size-threshold calculation process with respect to all or a part of the processing content processable by the HW arithmetic unit 120, to determine a value of SIZE (processing content), which is the data size threshold value according to the above method. The calculated value (SIZE (processing content)) is stored in the memory 110 or the like so that it can be shared by the arithmetic-mode determining unit 102. The data size threshold value calculated by the data-size threshold calculator 101 can be notified to the arithmetic-mode determining unit 102, and stored in the arithmetic-mode determining unit 102.

In the first embodiment, the data size threshold value, which becomes the criterion for selecting the arithmetic mode, can be calculated and stored beforehand. Consequently, even if the hardware configuration is different, optimum data size threshold value can be determined depending on the configuration.

In FIG. 5, an example in which the processing time of the synchronous processing decreases when the data size is small has been explained. However, for a case in which the processing time of the asynchronous processing decreases when the data size is small, the data size threshold value can be also calculated according to the same method. In this case, when the processing time is smaller than the data size threshold value, the asynchronous mode is determined as the arithmetic mode.

The communication processing is explained next with reference to FIGS. 8A and 8B.

As one example of the communication processing, a process when AES-CBC (encryption) processing is performed as the IPsec protocol processing with respect to a payload of the packet received by the communication apparatus 100 is explained.

It is assumed here that security association (SA) and security policy (SP) based on the IPsec protocol have been already set between the communication apparatus 100 and the communication apparatus 200.

The network interface 131 in the communication apparatus 100 first receives an IP packet transmitted from the terminal device 400 to the communication apparatus 100, and notifies the network processor 104 of reception of the packet. The network processor 104 performs analysis of the header of the received packet and network processing such as the IPsec protocol processing (step S801).

The network processor 104 then gives an instruction relating to the HW arithmetic processing to the arithmetic-process control unit 103 (step S802). In this example, the network processor 104 instructs the arithmetic-process control unit 103 to execute the encryption processing of the payload of the received packet according to the AES-CBC by the HW arithmetic unit 120.

The arithmetic-process control unit 103 having received the instruction calls the arithmetic-mode determining unit 102 (step S803). The arithmetic-mode determining unit 102 compares the data size of the data to be processed (payload of the received packet) with the SIZE (AES-CBC (encryption)), which is the data size threshold value, to determine the arithmetic mode (step S804). In the first embodiment, when the data size to be processed exceeds the SIZE (AES-CBC (encryption)), the arithmetic-mode determining unit 102 determines the asynchronous mode as the arithmetic mode, and when the data size is smaller than the SIZE (AES-CBC (encryption)), the arithmetic-mode determining unit 102 determines the synchronous mode as the arithmetic mode.

For example, when SIZE (AES-CBC (encryption))=700 bytes, and the data size to be processed=512 bytes, because the data size to be processed is smaller than the SIZE (AES-CBC (encryption)), the arithmetic-mode determining unit 102 determines the synchronous mode as the arithmetic mode.

Further, for example, when SIZE (AES-CBC (encryption))=700 bytes, and the data size to be processed=1024 bytes, because the data size to be processed is larger than the SIZE (AES-CBC (encryption)), the arithmetic-mode determining unit 102 determines the asynchronous mode as the arithmetic mode.

When the data size and the SIZE (processing content) agree with each other, the arithmetic-mode determining unit 102 determines to use a predetermined arithmetic mode of either the asynchronous mode or the synchronous mode. In this case, the arithmetic-mode determining unit 102 can be configured to determine the arithmetic mode according to a dynamic rule such as adopting the synchronous mode and the asynchronous mode alternately.

The arithmetic-mode determining unit 102 notifies the arithmetic-process control unit 103 of the determined arithmetic mode (step S805). The arithmetic-process control unit 103 having received the notification determines whether the determined arithmetic mode is the synchronous mode or the asynchronous mode (step S806).

In the case of the synchronous mode (YES at step S806), the arithmetic-process control unit 103 instructs the processing content to the HW arithmetic unit 120 to start the encryption processing (step S807). Thereafter, the arithmetic-process control unit 103 waits for termination of the processing by the HW arithmetic unit 120 (step S808).

Upon reception of a termination notification of the arithmetic processing from the HW arithmetic unit 120, the arithmetic-process control unit 103 notifies the network processor 104 of termination of the processing according to the synchronous mode (step S809), to finish the process.

On the other hand, when the arithmetic-process control unit 103 determines that the arithmetic mode is the asynchronous mode at step S806 (NO at step S806), the arithmetic-process control unit 103 executes the asynchronization preprocessing such as storing the processing state (step S810). The arithmetic-process control unit 103 then operates the HW arithmetic unit 120 to start the arithmetic operation according to the instructed processing content (step S811). Because the arithmetic mode is the asynchronous mode, the arithmetic-process control unit 103 notifies the network processor 104 of the start of the HW arithmetic processing according to the asynchronous mode, to finish the process (step S812).

Thereafter, upon reception of a termination notification of the arithmetic processing from the HW arithmetic unit 120, the arithmetic-process control unit 103 executes the asynchronization postprocessing such as reloading operation of the stored processing state (step S813). When the postprocessing is complete, the arithmetic-process control unit 103 notifies the network processor 104 of termination of the process according to the asynchronous mode (step S814), to finish the process.

At step S807 or step S811, the HW arithmetic unit 120, which is operated to start the arithmetic operation by the arithmetic-process control unit 103, executes the arithmetic processing according to the instructed processing content (step S815). For example, the HW arithmetic unit 120 executes encryption in which the algorithm is the AES-CBC mode with respect to the data (payload of the packet) at a received data address.

When the arithmetic processing is complete, the HW arithmetic unit 120 notifies the arithmetic-process control unit 103 of the termination of the arithmetic processing (step S816), to finish the process.

After instructing the arithmetic-process control unit 103 to perform the arithmetic operation, the network processor 104 determines whether the start notification of the HW arithmetic processing according to the asynchronous mode has been received from the arithmetic-process control unit 103 (step S817).

When the start notification of the HW arithmetic processing according to the asynchronous mode has been received (YES at step S817), the network processor finishes the process. When the start notification has not been received (NO at step S817), it can be determined that the arithmetic operation is being performed according to the synchronous mode. Therefore, the network processor 104 continues the processing to receive the termination notification of the arithmetic operation according to the synchronous mode.

After having received the termination notification of the arithmetic processing transmitted from the arithmetic-process control unit 103 at step S809 or step S814, the network processor 104 executes the network processing such as the IPsec protocol or the IP protocol processing required after the encryption processing (step S818). The network processor 104 then instructs the network interface 131 to transmit the packet (step S819).

According to the method of the first embodiment, by comparing the data size to be processed with the data size threshold value, either the synchronous mode or the asynchronous mode, whichever is appropriate, can be selected to perform data processing.

A process flow when the communication apparatus 100 performs the encoding (encryption) processing is shown here. However, when decoding (decryption) processing is performed, it can be realized with the same configuration and the same process flow. An example in which the network processing including encryption is performed by the network processor 104 in the communication apparatus 100 is shown here. However, when the network processor 104 uses the HW arithmetic unit 120 to perform the arithmetic processing (for example, data compression/expansion processing) other than encryption, it can be realized with the same configuration and the same process flow.

In the data-size-threshold calculation process, the data-size threshold calculator 101 records the time. That is, when the synchronous mode is selected, the data-size threshold calculator 101 measures and records the processing time from the test instruction given to the arithmetic-process control unit 103 until the termination of the process by the arithmetic-process control unit 103. When the asynchronous mode is selected, the data-size threshold calculator 101 measures and records the processing time from the test instruction given to the arithmetic-process control unit 103 until the start of the HW arithmetic operation notified by the arithmetic-process control unit 103, and the processing time from reception of the termination of the process notification from the HW arithmetic unit 120 by the arithmetic-process control unit 103 until the termination of the process by the arithmetic-process control unit 103.

In the case of such a configuration, because the data-size threshold calculator 101 measures the time, there is an advantage in that the arithmetic-process control unit 103 need not have the function of measuring the time.

Figure 9A:
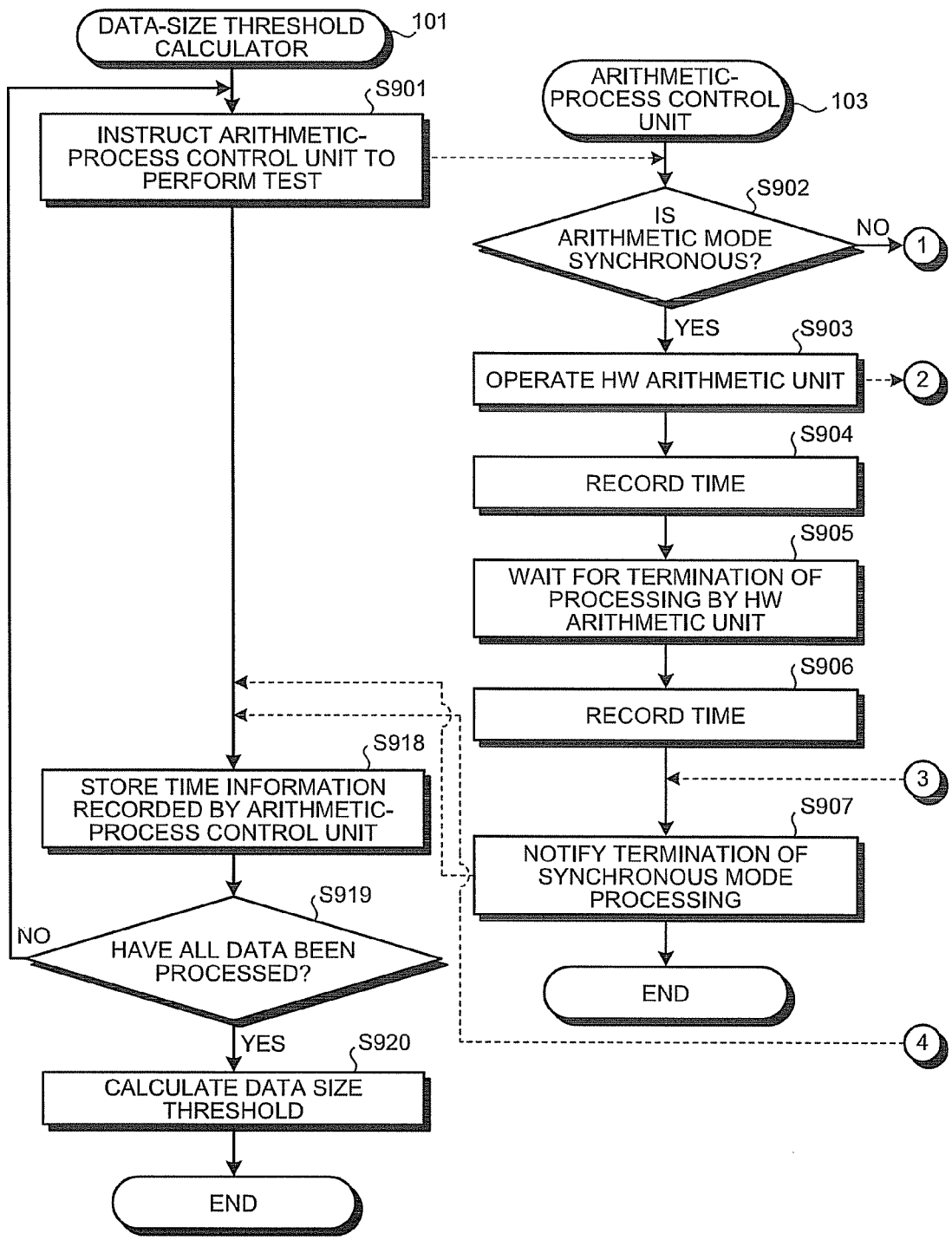
FIGS. 9A and 9B are flowcharts of an overall flow of a data-size-threshold calculation process in a first modification of the first embodiment.
Figure 9B:
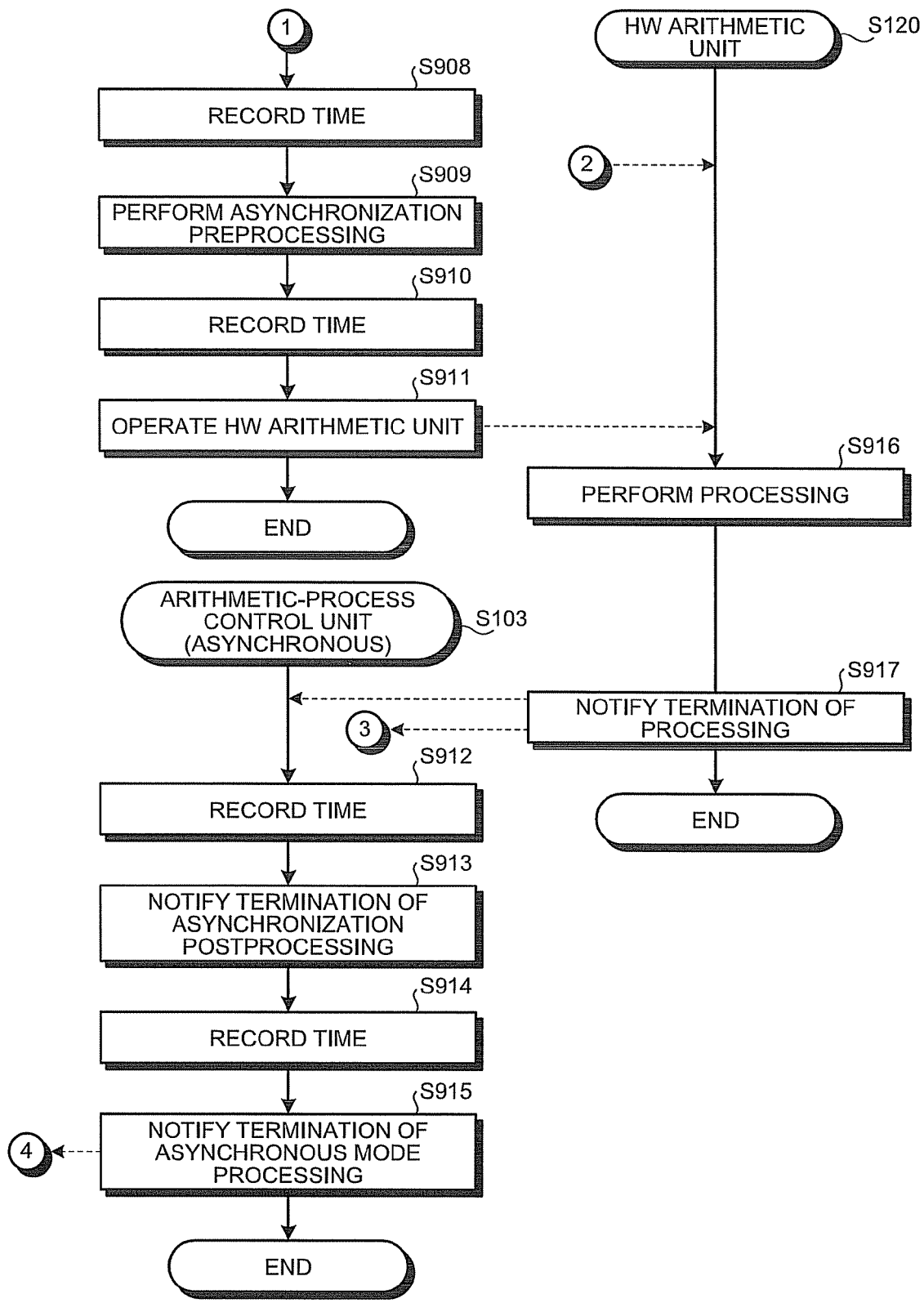

On the other hand, the configuration can be such that the arithmetic-process control unit 103 records the time, and the recorded information is passed on to the data-size threshold calculator 101 to thereby execute the data-size-threshold calculation process. FIGS. 9A and 9B are flowcharts of an overall flow of the data-size-threshold calculation process in a first modification of the first embodiment.

As shown in FIGS. 9A and 9B, in the first modification, a component part for recording the time is changed, as compared with FIGS. 7A and 7B depicting the data-size-threshold calculation process in the first embodiment. Specifically, a time recording process at step S701 in FIGS. 7A and 7B is changed to step S904 (record Tsync1) and step S908 (record Tasync1) in FIGS. 9A and 9B. Further, the time recording process at step S705 and step S707 in FIGS. 7A and 7B is changed to step S910 (record Tasync2) and step S912 (record Tasync3) in FIGS. 9A and 9B. Furthermore, the time recording process at step S719 in FIGS. 7A and 7B is changed to step S906 (record Tsync2) and step S914 (record Tasync4) in FIGS. 9A and 9B.

With the above change, the notification process of processing start and termination from the arithmetic-process control unit 103 to the data-size threshold calculator 101 (steps S713 and S714) is deleted. Further, an arithmetic-mode determination process (step S704) by the data-size threshold calculator 101 is also deleted, and a process at which the time information recorded by the arithmetic-process control unit 103 is stored by the data-size threshold calculator 101, upon reception of the notification (step S918), is added.

Thus, in the process flow shown in FIGS. 9A and 9B, when the synchronous mode is selected, the arithmetic-process control unit 103 measures and records the processing time corresponding to the time during which the processing of the HW arithmetic unit 120 is waited for (step S905). When the asynchronous mode is selected, the arithmetic-process control unit 103 measures and records the processing time of asynchronization preprocessing (step S909) and asynchronization postprocessing (step S913).

In the case of such a configuration, the time relating to the common processing between the synchronous mode and the asynchronous mode is not measured, and only the time relating to the difference in the processing content between the synchronous mode and the asynchronous mode can be measured. Accordingly, there is an advantage in that a measurement error of the processing time hardly occurs.

In the data-size-threshold calculation process, the processing time is measured directly in the process flow. On the other hand, the processing time can be presumed by using a method referred to as profiling, to calculate the data size threshold value.

Profiling is a method for presuming execution time of each process by recording the process being executed on the PU 105 at regular time intervals (hereinafter, "sampling"). OProfile installed on the Linux$^{(registered\ trademark)}$ is a representative example implementation. A ratio of the number of samples for each process obtained by sampling expresses the ratio of the execution time of the process being executed on the PU 105. Accordingly, the ratio of the execution time for each process can be compared by comparing the magnitude of the number of samples for each process.

When the threshold value is obtained by using the profiling method, profiling is performed for the process excluding the time measurement process from the data-size-threshold calculation process shown in FIGS. 7A and 7B, and the number of samples is compared between the synchronous mode and the asynchronous mode as shown in FIG. 5, thereby determining the threshold value.

According to such a configuration, the data-size threshold calculator 101 and the arithmetic-process control unit 103 need not have the time measuring function, thereby enabling to facilitate installation thereof.

In the first embodiment, the data-size threshold calculator 101 executes the data-size-threshold calculation process to calculate the data size threshold value, and stores the threshold value in the memory 110 or the like. On the other hand, the data size threshold value obtained by the external device or the like beforehand can be stored in the memory 110 or the like, without performing the data-size-threshold calculation process. In this case, the data-size threshold calculator 101 is not required. The data size threshold value can be also changed to an arbitrary value.

In the information processing apparatus according to the first embodiment, when the arithmetic processing is executed by the hardware, either the synchronous mode or the asynchronous mode, whichever is appropriate, can be selected according to the data size of the data to be processed to perform processing, so that the load on the PU decreases all the time. Accordingly, an increase of the arithmetic processing load can be avoided.

An information processing apparatus according to a second embodiment of the present invention can execute a specific arithmetic processing executed by hardware, and executes the arithmetic processing according to any mode of a software mode, a hardware synchronous mode, and a hardware asynchronous mode according to the data size.

Figure 10:
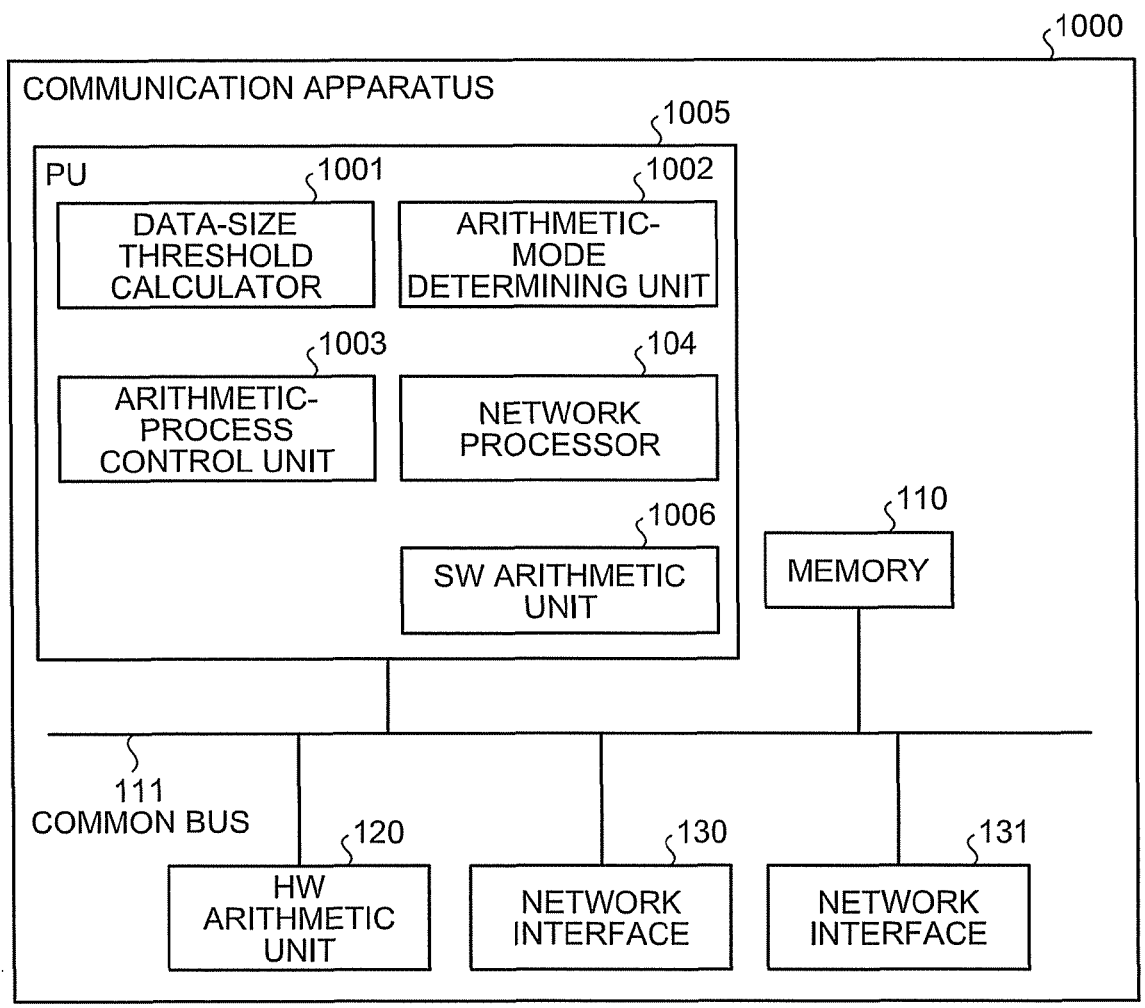
FIG. 10 is a block diagram of a configuration of a communication apparatus according to a second embodiment of the present invention.

Because a network configuration of a communication system according to the second embodiment is the same as that shown in FIG. 1 depicting the network configuration in the first embodiment, explanations thereof will be omitted. As shown in FIG. 10, a communication apparatus 1000 includes a PU 1005, the HW arithmetic unit 120, the memory 110, and the network interfaces 130 and 131 as the main hardware configuration.

As shown in FIG. 10, the PU 1005 includes a data-size threshold calculator 1001, an arithmetic-mode determining unit 1002, an arithmetic-process control unit 1003, and the network processor 104, and an SW arithmetic unit 1006.

In the second embodiment, the functions of the data-size threshold calculator 1001, the arithmetic-mode determining unit 1002, and the arithmetic-process control unit 1003, and addition of the SW arithmetic unit 1006 are different from the configuration in the first embodiment. Because other configurations and functions are the same as those in FIG. 1, which is a block diagram of the configuration of the communication apparatus 100 according to the first embodiment, like reference numerals refer to like parts, and explanations thereof will be omitted.

The SW arithmetic unit 1006 executes a specific arithmetic operation such as encryption/decryption and data compression/expansion executed by the HW arithmetic unit 120 as software operating on the PU 1005.

The data-size threshold calculator 1001 calculates the data size threshold value, which is the criterion at the time of determining which one of the three arithmetic modes, that is, the synchronous mode and the asynchronous mode performed by the HW arithmetic unit 120 (hereinafter, "HW synchronous mode" and "HW asynchronous mode", respectively) added with an SW arithmetic mode in which the arithmetic operation is executed by the SW arithmetic unit 1006, is to be selected.

FIGS. 11 and 12 are schematic diagrams for explaining the test sheet example used in the data-size-threshold calculation process. As shown in FIGS. 11 and 12, in the second embodiment, "SW" is added as the arithmetic mode. When "SW" is specified as the arithmetic mode, the arithmetic-process control unit 1003 described later controls so that the arithmetic processing is executed by the SW arithmetic unit 1006.

Figures 13, 14:
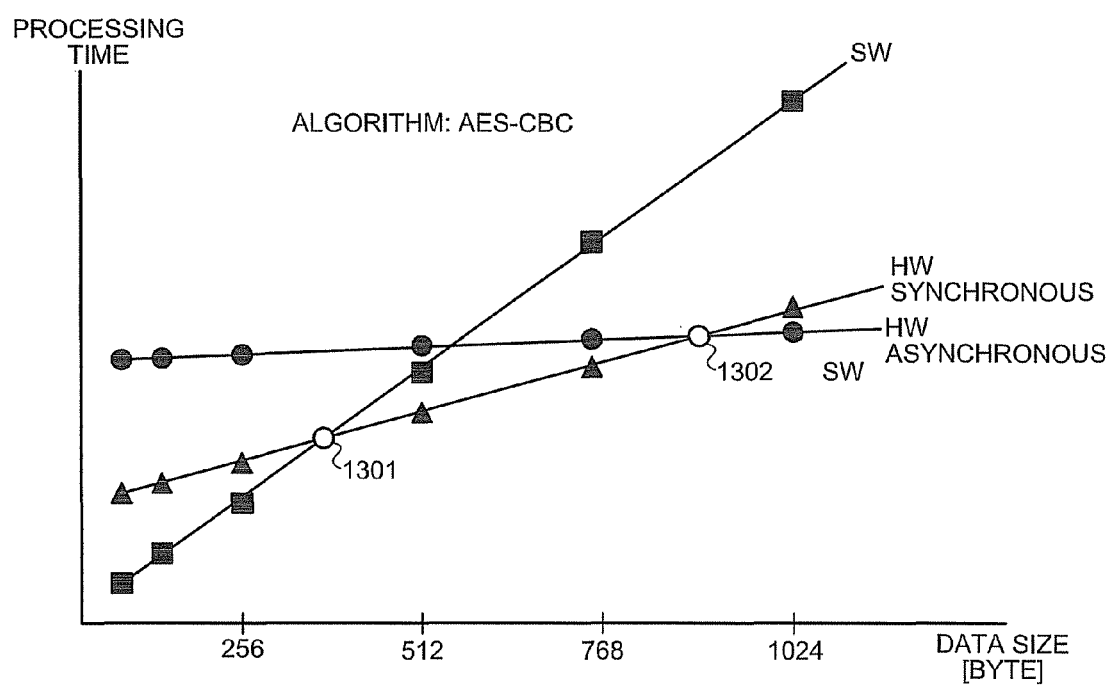
FIG. 13 is a graph representing a relation between a data size and a processing time in the second embodiment.
FIG. 14 is a schematic diagram for explaining one example of a storage format of a data size threshold value in the second embodiment.

FIG. 13 is a graph representing a relation between the data size and the processing time measured by the data-size threshold calculator 1001 in the second embodiment. As shown in FIG. 13, in the second embodiment, the processing time is also measured for the SW arithmetic mode, which is the added arithmetic mode.

The data-size threshold calculator 1001 determines the data size corresponding to the node of the obtained lines connecting the processing time in the respective arithmetic modes as shown in FIG. 13 as the data size threshold value. In the example shown in FIG. 13, the data-size threshold calculator 1001 calculates the data size corresponding to a node 1301 as a threshold value for dividing the SW arithmetic mode and the other arithmetic modes performed by the HW arithmetic unit 120 (the HW synchronous mode and the HW asynchronous mode). Further, the data-size threshold calculator 1001 calculates the data size corresponding to a node 1302 as a threshold value for dividing the HW synchronous mode and the HW asynchronous mode.

As shown in FIG. 14, in the second embodiment, a switching content is added and the data size threshold value is stored for each switching content. The switching content is an item for specifying a threshold value for switching between which of the arithmetic modes. In FIG. 14, an example in which "sw-sync" and "sync-async" are specified as the switching content is shown. "sw-sync" means that it is a threshold value for switching between the SW arithmetic mode and the HW synchronous mode. "sync-async" means that it is a threshold value for switching between the HW synchronous mode and the HW asynchronous mode.

Returning to FIG. 10, the arithmetic-mode determining unit 1002 compares the criterion (data size threshold value) calculated by the data-size threshold calculator 1001 with the data size of the data to be processed passed on from the arithmetic-process control unit 1003, to thereby determine any one of the arithmetic modes of the SW arithmetic mode, the HW synchronous mode, and the HW asynchronous mode.

The arithmetic-process control unit 1003 controls so that the specific arithmetic processing such as encryption/decryption or data compression/expansion is executed by the HW arithmetic unit 120 or the SW arithmetic unit 1006.

Figure 15A:
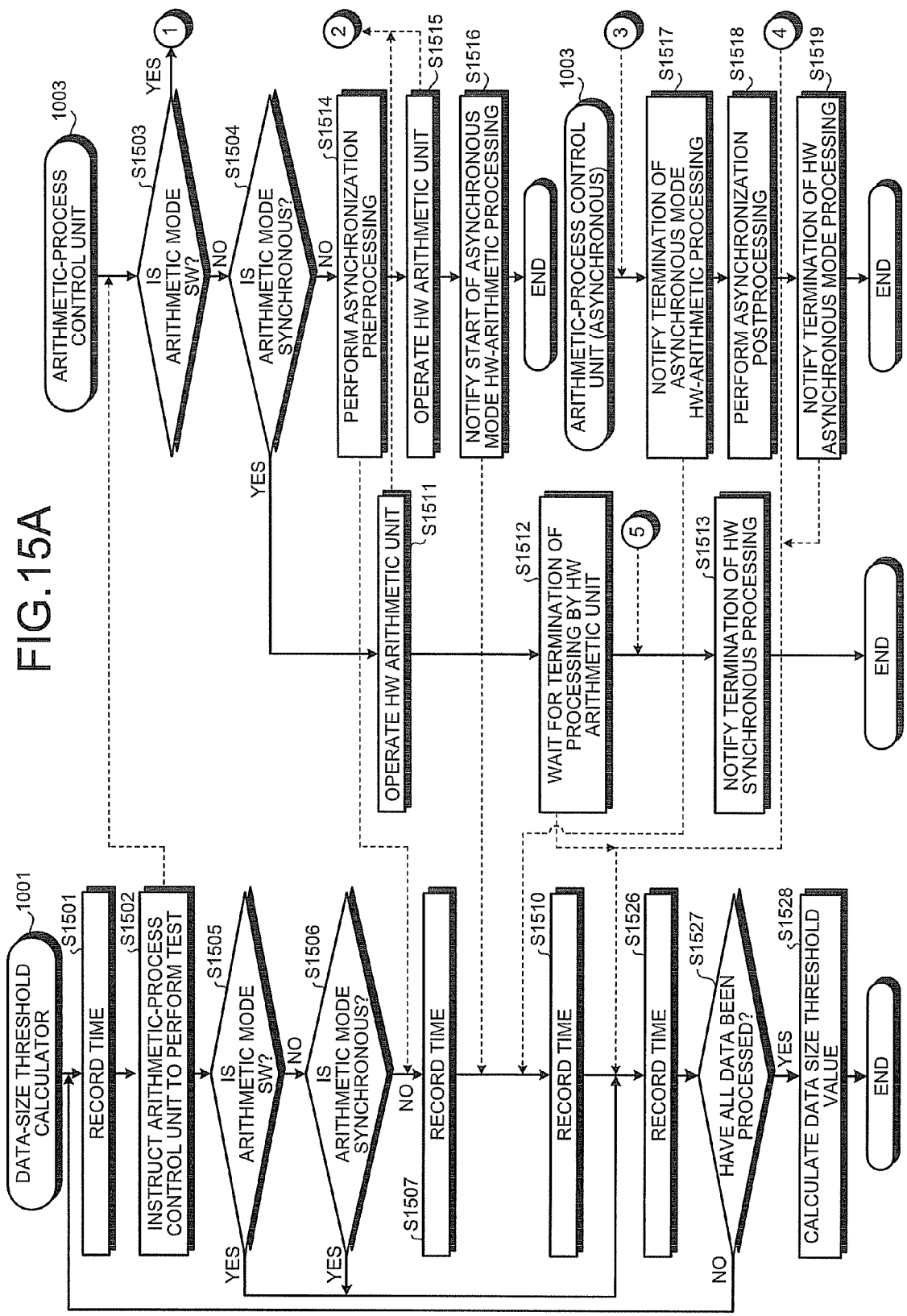
FIGS. 15A and 15B are flowcharts of an overall flow of a data-size-threshold calculation process in the second embodiment.
Figure 15B:
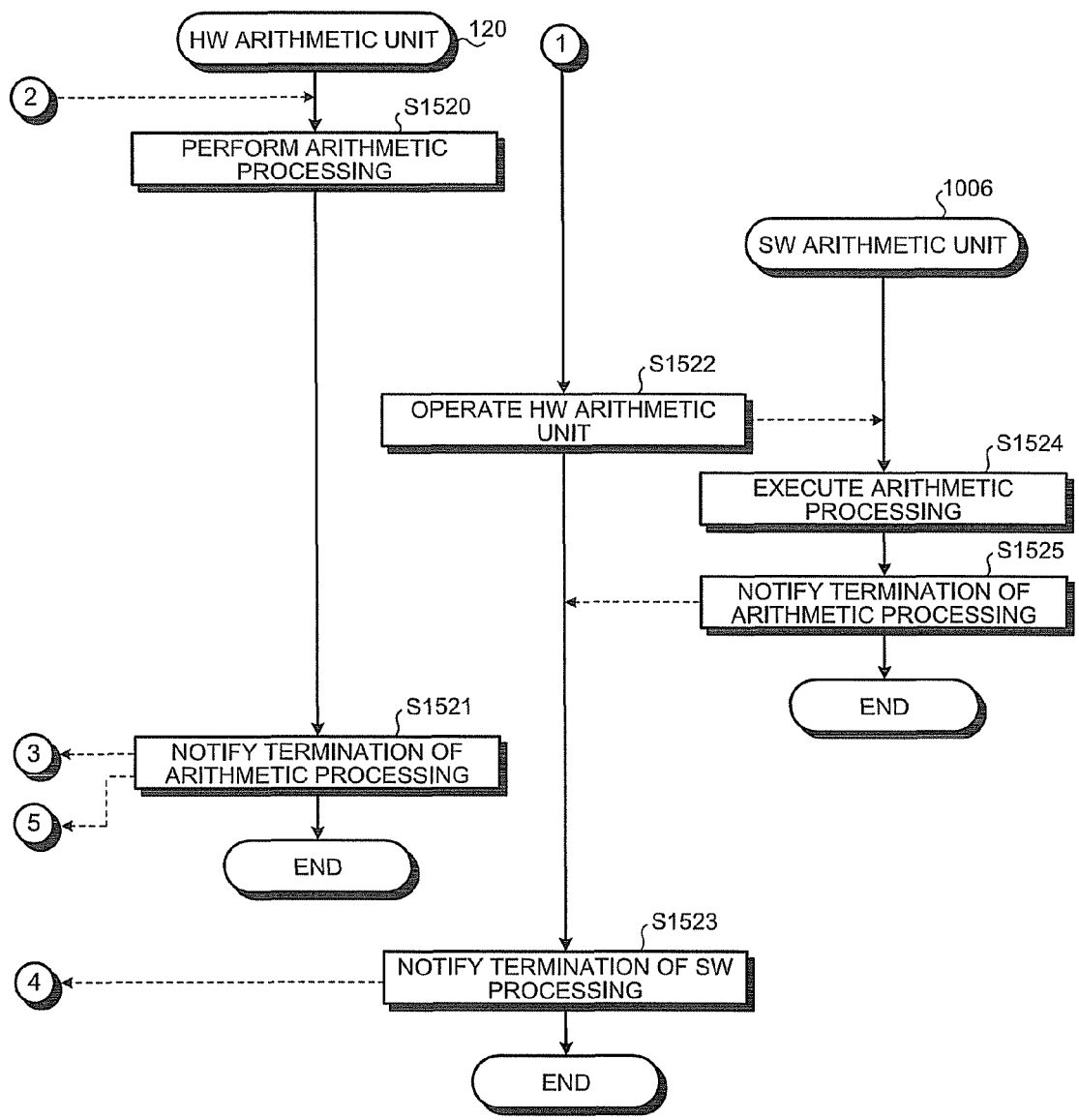

A data-size-threshold calculation process in the second embodiment is explained next with reference to FIGS. 15A and 15B.

Because a time recording process and a test instruction process from step S1501 to step S1502 are the same as those from step S701 to step S702 in the communication apparatus 100 according to the first embodiment, explanations thereof will be omitted.

For sake of simplicity, the time recorded at step S1501 is referred to as time Tsw1 in the case of the SW arithmetic mode, time Tsync1 in the case of the synchronous mode, and time Tasync1 in the case of the asynchronous mode.

The arithmetic-process control unit 1003 having received the instruction of the test determines whether the arithmetic mode of the test sheet is the SW arithmetic mode (step S1503). For example, when execution of No.=C301 in the test sheet shown in FIG. 11 is instructed, the arithmetic-process control unit 1003 determines that the arithmetic mode is the SW arithmetic mode.

When the arithmetic mode is not the SW arithmetic mode (NO at step S1503), the arithmetic-process control unit 1003 further determines whether the arithmetic mode is the HW synchronous mode or the HW asynchronous mode (step S1504). For example, when execution of No.=C302 in the test sheet shown in FIG. 11 is instructed, the arithmetic-process control unit 1003 determines that the arithmetic mode is the HW synchronous mode. For example, when execution of No.=C303 in the test sheet shown in FIG. 11 is instructed, the arithmetic-process control unit 1003 determines that the arithmetic mode is the HW asynchronous mode.

Because a test process according to the synchronous mode, the test process according to the asynchronous mode, and the arithmetic processing according to the HW arithmetic unit 120 from step S1511 to S1521 are the same as those from step S708 to step S718 in the communication apparatus 100 according to the first embodiment, explanations thereof will be omitted.

When having determined that the arithmetic mode is the SW arithmetic mode (YES at step S1503), the arithmetic-process control unit 1003 operates the SW arithmetic unit 1006 to start the arithmetic operation according to the processing content of the test sheet (step S1522).

The SW arithmetic unit 1006 executes the arithmetic processing of the instructed processing content (step S1524). For example, when execution of No.=C301 in the test sheet shown in FIG. 11 is instructed, the SW arithmetic unit 1006 performs encryption in which the algorithm is the AES-CBC mode with respect to the data for 64 bytes from address A01 on the memory 110, and writes processing result data in an area for 64 bytes from address A02 on the memory 110.

When the arithmetic processing is complete, the SW arithmetic unit 1006 notifies the arithmetic-process control unit 1003 of the termination of the arithmetic processing (step S1525), to finish the process.

Upon reception of a termination notification of the arithmetic processing from the SW arithmetic unit 1006, the arithmetic-process control unit 1003 notifies the data-size threshold calculator 1001 of termination of the processing according to the SW arithmetic mode (step S1523) to finish the process.

After instructing the test at step S1502, the data-size threshold calculator 1001 determines whether the arithmetic mode of the instructed test is the SW arithmetic mode (step S1505). When the arithmetic mode is not the SW arithmetic mode (NO at step S1505), the data-size threshold calculator 1001 further determines whether the arithmetic mode is the HW synchronous mode (step S1506).

When the arithmetic mode is not the HW synchronous mode, that is, it is the HW asynchronous mode (NO at step S1506), the data-size threshold calculator 1001 records time Tasync2 at a point in time when the start notification of the HW arithmetic processing is received from the arithmetic-process control unit 1003 (step S1507). Further, the data-size threshold calculator 1001 records time Tasync3 at a point in time when the termination notification of the HW arithmetic processing is received from the arithmetic-process control unit 1003 (step S1510).

After recording the time Tasync3, or when it is determined that the arithmetic mode is the SW arithmetic mode at step S1505 (YES at step S1505), or it is determined that the arithmetic mode is the HW synchronous mode at step S1506 (YES at step S1506), the data-size threshold calculator 1001 records the time at a point in time when the termination notification of the processing is received from the arithmetic-process control unit 1003 (step S1526). For sake of simplicity, the time recorded at this step is referred to as time Tsw2 in the case of the SW arithmetic mode, time Tsync2 in the case of the synchronous mode, and time Tasync4 in the case of the asynchronous mode.

Because the termination determination processing at step S1527 is the same as that at step S720 in the communication apparatus 100 according to the first embodiment, explanations thereof will be omitted.

When all the data is processed (YES at step S1527), the data-size threshold calculator 1001 calculates the data size threshold value based on the recorded each time (step S1528).

In the second embodiment, the data-size threshold calculator 1001 calculates the processing time Tsync by the HW synchronous mode and the processing time Tasync by the HW asynchronous mode according to the above equations (1) and (2), respectively. The data-size threshold calculator 1001 calculates the processing time Tsw by the SW arithmetic mode according to the following equation (3).

$$Tsw = Tsw2 - Tsw1 \qquad (3)$$

FIG. 13 is an example of the processing time for each arithmetic mode calculated in this manner. In this example, the magnitude relation between the values of Tsw and Tsync is reversed between 256 bytes and 512 bytes. The data-size threshold calculator 1001 determines the data size, at which the magnitude relation is reversed, as the data size threshold value involved with the processing by the SW arithmetic mode and the HW synchronous mode, and expresses the data size as SIZEsw-sync (processing content).

For example, when the threshold value obtained with respect to the processing content="AES-CBC (encryption)" is 300 bytes, the data size threshold value is expressed as SIZEsw-sync (AES-CBC (encryption))=300 bytes. In the same manner, SIZEsync-async (AES-CBC (encryption)) expressing the data size threshold value relating to the processing content of the HW synchronous mode and the HW asynchronous mode can be obtained from the relation between Tsync and Tasync.

FIG. 14 is an example of the calculated data size threshold value. FIG. 14 is an example when SIZEsw-sync (AES-CBC (encryption)) is 300 bytes, SIZEsync-async (AES-CBC (encryption)) is 700 bytes, SIZEsw-sync (DES-CBC (encryption)) is 400 bytes, and SIZEsync-async (DES-CBC (encryption)) is 900 bytes.

The second embodiment can be also configured such that the data size threshold value can be calculated in the same manner as that of the first modification of the first embodiment.

Figure 16B:
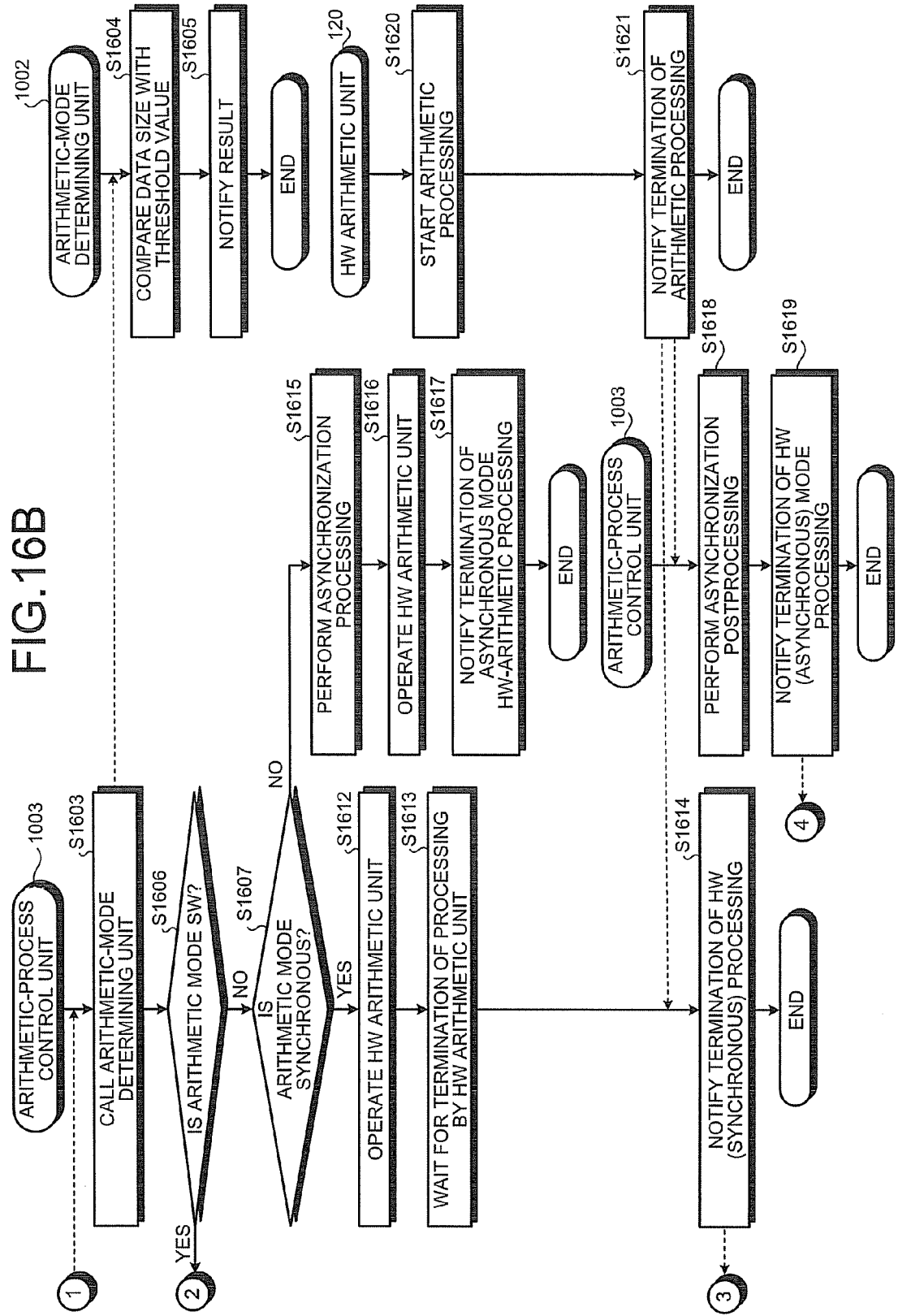

The communication processing in the second embodiment is explained next with reference to FIGS. 16A and 16B.

As one example of the communication processing, a process when AES-CBC (encryption) processing is performed as the IPsec protocol processing with respect to the payload of the packet received by the communication apparatus 1000 is explained. In this example, it is assumed that SIZEsw-sync (AES-CBC (encryption)) is 300 bytes and SIZEsync-async (AES-CBC (encryption)) is 800 bytes.

Because the network processing and an arithmetic-operation instruction processing from step S1601 to step S1603 are the same as those from step S801 to step S803 in the communication apparatus 100 according to the first embodiment, explanations thereof will be omitted.

The arithmetic-mode determining unit 1002 called by the arithmetic-process control unit 1003 at step S1603 compares the data size of the data to be processed (payload of the received packet) with SIZEsw-sync (AES-CBC (encryption)) and SIZEsync-async (AES-CBC (encryption)), which are the data size threshold values, to determine the arithmetic mode (step S1604).

In the second embodiment, the arithmetic-mode determining unit 1002 determines that the arithmetic mode is the SW arithmetic mode, when the data size to be processed is below SIZEsw-sync (AES-CBC (encryption)). When the data size exceeds SIZEsw-sync (AES-CBC (encryption)) and is below SIZEsync-async (AES-CBC (encryption)), the arithmetic-mode determining unit 1002 determines the arithmetic mode as the HW synchronous mode. When the data size exceeds SIZEsync-async (AES-CBC (encryption)), the arithmetic-mode determining unit 1002 determines the arithmetic mode as the HW asynchronous mode.

For example, when the data size to be processed is 256 bytes, because the data size to be processed is smaller than SIZEsw-sync (AES-CBC (encryption))=300 bytes, the arithmetic-mode determining unit 1002 determines the arithmetic mode as the SW arithmetic mode. When the data size to be processed is 512 bytes, because the data size exceeds SIZEsw-sync (AES-CBC (encryption))=300 bytes, and is below SIZEsync-async (AES-CBC (encryption))=800 bytes, the arithmetic-mode determining unit 1002 determines the arithmetic mode as the HW synchronous mode. Further, when the data size to be processed is 1024 bytes, because the data size exceeds SIZEsync-async (AES-CBC (encryption))=800 bytes, the arithmetic-mode determining unit 1002 determines the arithmetic mode as the HW asynchronous mode.

The arithmetic-mode determining unit 1002 notifies the arithmetic-process control unit 1003 of the determined arithmetic mode (step S1605). The arithmetic-process control unit 1003 having received the notification determines whether the determined arithmetic mode is the SW arithmetic mode (step S1606).

When the arithmetic mode is the SW arithmetic mode (YES at step S1606), the arithmetic-process control unit 1003 instructs the processing content to the SW arithmetic unit 1006 to start the encryption processing (step S1608).

The SW arithmetic unit 1006 executes the arithmetic processing of the instructed processing content (step S1609). For example, the SW arithmetic unit 1006 executes the encryption processing in which the algorithm is the AES-CBC mode with respect to the data (payload of the packet) at a received data address. When the arithmetic processing is complete, the SW arithmetic unit 1006 notifies the arithmetic-process control unit 1003 of the termination of the arithmetic processing (step S1610), to finish the process.

Upon reception of the termination notification of the arithmetic processing from the SW arithmetic unit 1006, the arithmetic-process control unit 1003 notifies the network processor 104 of the termination of the processing by the SW arithmetic mode (step S1611), to finish the process.

When it is determined that the arithmetic mode is not the SW arithmetic mode (NO at step S1606), the arithmetic-process control unit 1003 determines whether the arithmetic mode is the HW synchronous mode or the HW asynchronous mode (step S1607).

Because the HW arithmetic processing according to the synchronous mode, the HW arithmetic processing according to the asynchronous mode, the network processing, and a packet transmission processing from step S1612 to step S1624 are the same as those from step S807 to step S819 in the communication apparatus 100 according to the first embodiment, explanations thereof will be omitted.

Thus, in the image processor according to the second embodiment, the arithmetic processing can be executed by any one of the software mode, the hardware synchronous mode, and the hardware asynchronous mode, according to the data size. Accordingly, more appropriate arithmetic mode can be adopted, thereby enabling to avoid an increase of the arithmetic processing load. Also in the second embodiment, a modified configuration can be realized according to the same method as in the first modification of the first embodiment.

An image processor according to a third embodiment of the present invention performs processing by adopting either the synchronous mode or the asynchronous mode according to whether the process requesting the encryption processing is a real-time process, at the time of executing the encryption processing by the hardware.

Figure 17:
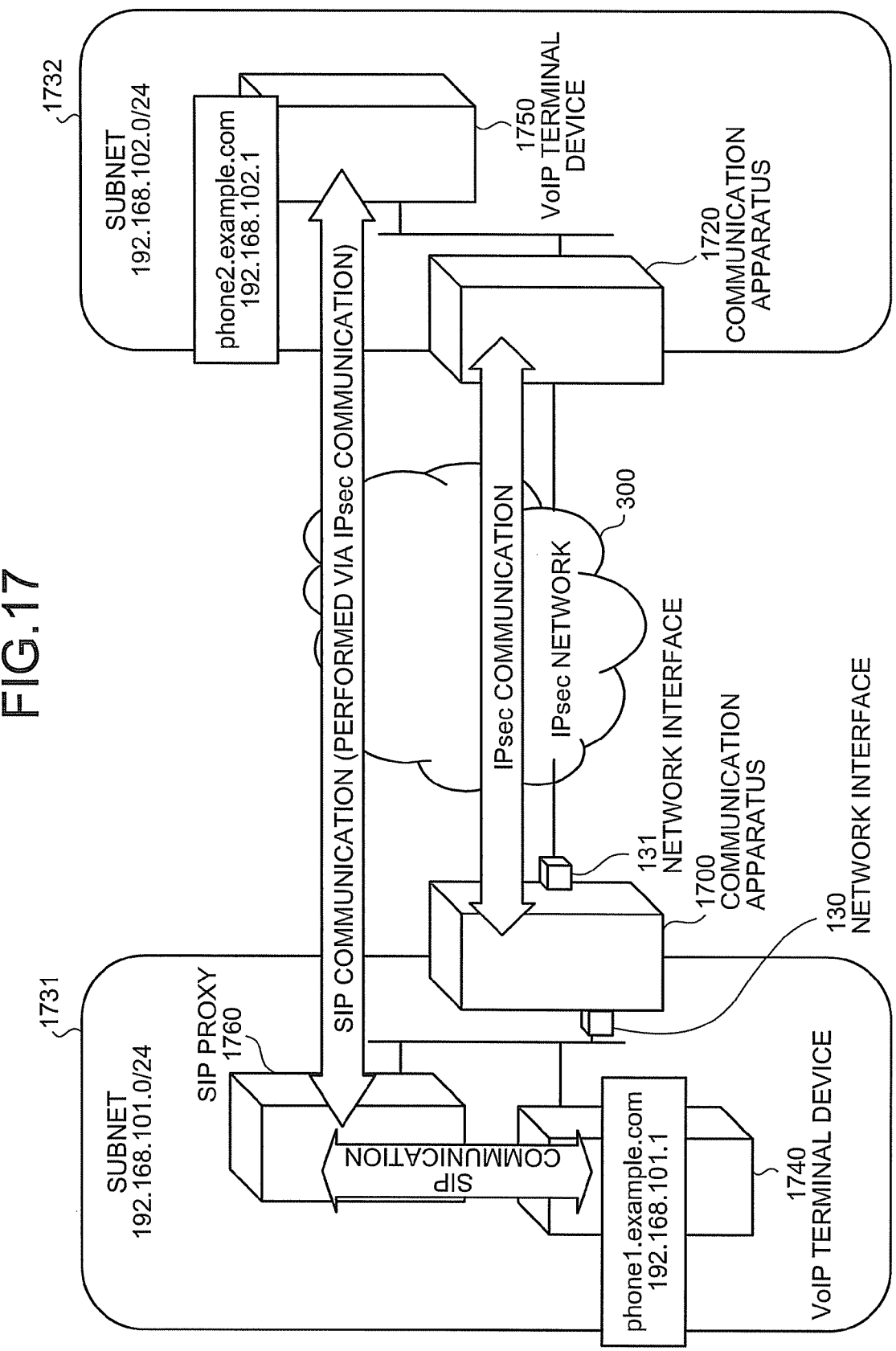
FIG. 17 is a network configuration diagram of a communication system according to a third embodiment of the present invention.

As shown in FIG. 17, a communication mode in the third embodiment has such a configuration that a communication apparatus 1700 and a communication apparatus 1720 as a communication partner are connected with each other by subnetworks 1731 and 1732.

A Voice over Internet Protocol (VoIP) terminal device 1740 and a Session Initiation Protocol (SIP) proxy 1760 are connected to the subnetwork 1731. A VoIP terminal device 1750 is connected to the subnetwork 1732.

The VoIP terminal device 1740 is a communication terminal device that uses the SIP for call setting according to the VoIP. In the third embodiment, the VoIP terminal device 1740 is set with a host name being "phone1.example.com", and IP address being "192.168.101.1".

The VoIP terminal device 1750 is a communication terminal device that uses the SIP for call setting by VoIP, as the VoIP terminal device 1740. In the third embodiment, the VoIP terminal device 1750 is set with a host name being "phone2.example.com", and IP address being "192.168.101.2".

The SIP proxy 1760 mediates the call setting of the VoIP terminal devices 1740 and 1750. Because there is no influence on the accuracy of the process (described later) for detecting information of real-time communication by the communication apparatus 1700, the SIP proxy 1760 can be installed in the subnetwork 1732. Further, the SIP proxy 1760 can be installed both in the subnetworks 1731 and 1732.

The communication apparatus 1700 performs packet processing and data processing relating to the IPsec protocol, and has a function of executing the encryption processing and the like by the hardware. As shown in FIG. 17, the communication apparatus 1700 connects to the IP network 300 and respective devices in the subnetwork 1731 via the network interfaces 130 and 131, respectively.

The communication apparatus 1720 performs communication with the communication apparatus 1700 according to the IPsec protocol. By performing IPsec communication between the communication apparatuses 1700 and 1720, the subnetworks 1731 and 1732 can be connected to each other by a communication line encrypted by the IPsec.

Figures 18, 19:
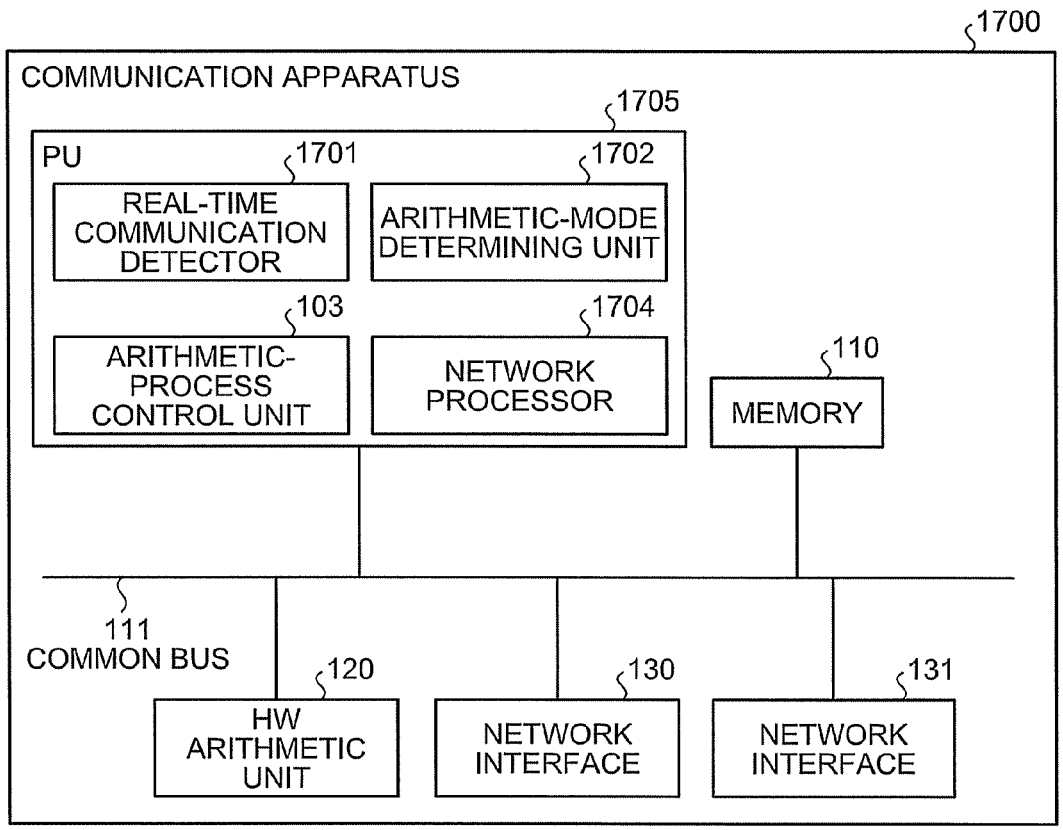
FIG. 18 is a block diagram of a configuration of a communication apparatus according to the third embodiment.
FIG. 19 is a schematic diagram for explaining one example of processing for detecting real-time communication identifying information.

A detailed configuration of the communication apparatus 1700 is explained next with reference to FIG. 18. As shown in FIG. 18, the communication apparatus 1700 includes, as the main hardware configuration, a PU 1705, the HW arithmetic unit 120, the memory 110, the network interface 130, and the network interface 131.

Further, as shown in FIG. 18, the PU 1705 includes a real-time communication detector 1701, an arithmetic-mode determining unit 1702, the arithmetic-process control unit 103, and a network processor 1704.

In the third embodiment, the real-time communication detector 1701 is added instead of the data-size threshold calculator 101, and the functions of the arithmetic-mode determining unit 1702 and the network processor 1704 are different from those in the first embodiment. Other configurations and functions are the same as those shown in FIG. 1, which is the block diagram of the configuration of the communication apparatus 100 according to the first embodiment, and therefore like reference numerals refer to like parts, and explanations thereof will be omitted.

The real-time communication detector 1701 detects identification information for identifying communication, for which real time performance is required (hereinafter, "real-time communication identifying information"), as the criterion when the arithmetic-mode determining unit 1702 determines which of the synchronous mode and the asynchronous mode is to be selected in the processing of the HW arithmetic unit 120.

The real-time communication detector 1701 detects real-time communication, which is executed by the communication apparatus 1700, among communications requiring either one of encryption/decryption and data compression/expansion. As an example of the real-time communication, communication for delivering voice data according to the VoIP can be mentioned.

Specifically, the real-time communication detector 1701 monitors a message relating to predetermined real-time communication such as signaling (call setting) communication. Representative examples of the protocol performing signaling communication include the session initiation protocol (SIP), H.323, a media gateway control protocol (MGCP), and a media gateway control (MEGACO) protocol.

When receiving the message relating to the real-time communication, the real-time communication detector 1701 extracts the real-time communication identifying information from the message. The real-time communication detector 1701 executes a detection process of the real-time communication identifying information prior to execution of the actual data processing, and stores the detected real-time communication identifying information in the memory 110 or the like.

An outline of processing for detecting the real-time communication identifying information is explained with reference to FIG. 19. FIG. 19 is a schematic diagram for explaining one example of the processing for detecting real-time communication identifying information.

A message shown in FIG. 19 is a representative example of 200 OK response message of SIP received from the SIP proxy 1760 by the communication apparatus 1700. On a line 1901, it is described that the message is the response message of 200 OK. On a line 1905, IPv4 address of the VoIP terminal device 1750 as a communication partner of the VoIP terminal device 1740 (192.168.102.1) is described. On a line 1906, a communication protocol (RTP) that performs VoIP communication and port number (43210) are described.

The real-time communication detector 1701 predetermines, for example, INVITE message and BYE message of the SIP, and the response message such as 200 OK (the example shown in FIG. 19) as a response thereto, as messages to be monitored for detecting the real-time communication. When having received the message to be monitored, the real-time communication detector 1701 extracts the IP address (192.168.102.1) of the VoIP communication partner, the communication protocol (RTP), and the port number (43210) from the received message as the real-time communication identifying information.

The real-time communication detector 1701 records tag values (abcdefg, 1234567) described on a line 1902 and a line 1903, and a Call-ID (10000001@example.com) described on a line 1904, together with the IP address, the communication protocol and the port number. Accordingly, when a plurality of calls is set between the same communication partner and the own communication apparatus, an individual call can be discriminated.

Figures 20, 21:
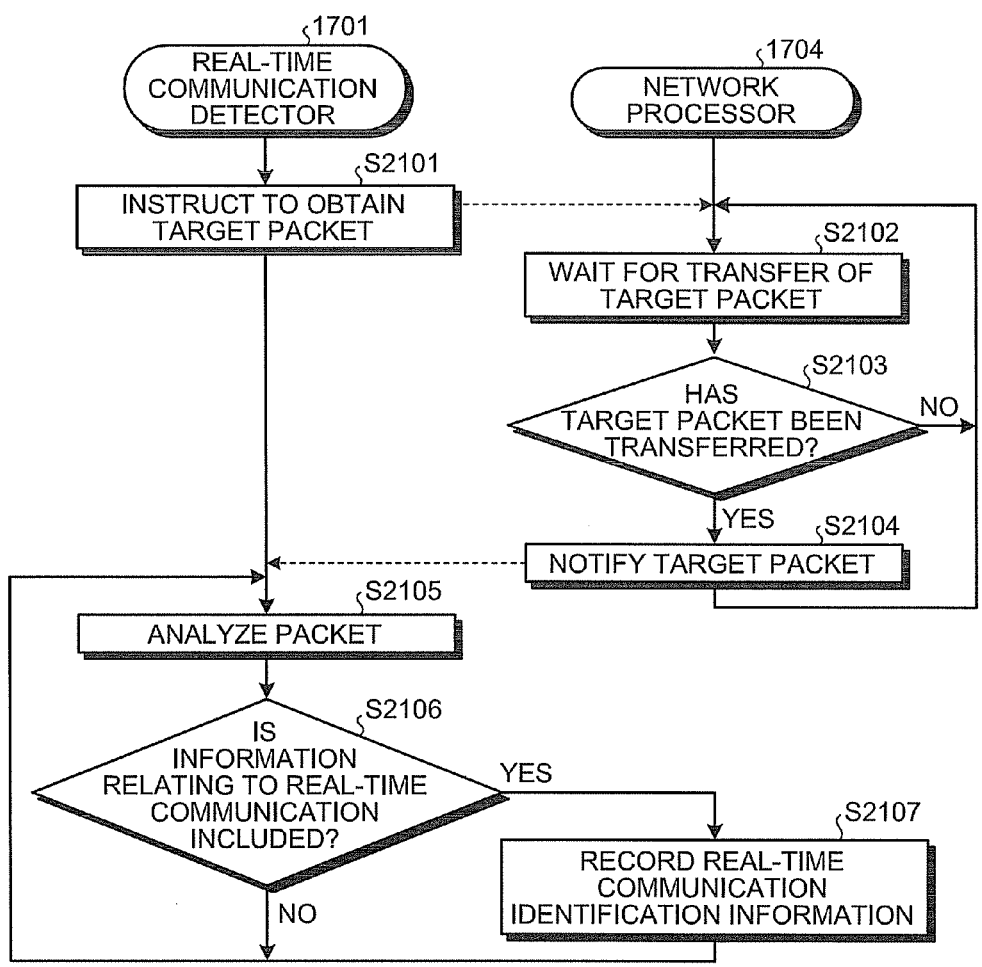
FIG. 20 is a schematic diagram for explaining one example of the real-time communication identifying information.
FIG. 21 is a flowchart of an overall flow of a real-time-communication detection process in the third embodiment.

FIG. 20 is a schematic diagram for explaining one example of the real-time communication identifying information extracted by the real-time communication detector 1701 and stored in the memory 110 or the like. A table recording the real-time communication identifying information (hereinafter, "real-time communication identification table") shown in FIG. 20 is referred to for determining the synchronous or asynchronous mode of the arithmetic processing by the arithmetic-mode determining unit 1702.

In the example of FIG. 20, a layer-3 protocol (L3 Proto), a transmission IP address (Src IP), a reception IP address (Dst IP), a layer-4 protocol (L4 Proto), a transmission port number (Src Port), a reception port number (Dst Port), and upper protocol information (Upper Info.) are recorded in the real-time communication identification table as the real-time communication identifying information. For "Upper Info.", information of an application protocol is described. For example, a uniform resource locator (URL) with respect to contents can be described for identifying motion picture distribution using a hypertext transfer protocol (HTTP).

The real-time communication identifying information is not limited thereto, and other pieces information can be included. Further, all the information in FIG. 20 is not necessarily used. That is, the real-time communication identifying information needs only to include information for determining whether it is the real-time processing in the communication processing. In the case of an information processing apparatus that executes processing other than the communication processing as in the third embodiment, information for determining whether it is the real-time processing (real-time identification information) is obtained, instead of the real-time communication identifying information, according to the processing content.

The storage format of the real-time communication identifying information is not limited to the table format as shown in FIG. 20. For example, the real-time communication identifying information can be stored in other formats such as a method of managing the real-time communication identifying information in association with hash with respect to a part or all of elements constituting the real-time communication identifying information, or a method of managing the real-time communication identifying information by a tree structure.

Returning to FIG. 18, the arithmetic-mode determining unit 1702 compares the real-time communication identifying information extracted by the real-time communication detector 1701 with the communication packet content, to determine either the synchronous mode or the asynchronous mode as the arithmetic mode.

The network processor 1704 uses the arithmetic-process control unit 103, as in the network processor 104 in the first embodiment, to make the HW arithmetic unit 120 execute a part or all of the processing. The network processor 1704 also has a function for passing the communication data transferred via the network interface 130 on to the real-time communication detector 1701. As a method for passing on the packet, conventionally used various methods such as a Berkeley packet filter (BPF) installed on a FreeBSD$^{(registered\ trademark)}$ operating system and a Linux socket filter (LSF) installed on a Linux$^{(registered\ trademark)}$ operating system can be applied.

Flows of various processes performed by the communication apparatus 1700 according to the third embodiment configured in this manner are explained below. The process performed by the communication apparatus 1700 can be divided into a real-time communication detection process executed beforehand and the communication process.

The real-time communication detection process is first explained with reference to FIG. 21.

First, the real-time communication detector 1701 instructs the network processor 1704 the packet type, which is passed on to the real-time communication detector 1701 (target packet), among the packets transferred by the network processor 1704 (step S2101).

At this time, the real-time communication detector 1701 can instruct the network processor 1704 to pass all the communication packets transferred by the network processor 1704 on to the real-time communication detector 1701, or the type of the communication packet subjected to the real-time communication detection process beforehand can be pre-stored and the real-time communication detector 1701 can instruct the network processor 1704 to pass on only this type of packet.

As a method for limiting the packet type, for example, a method for limiting the packet type according to the type of the signaling protocol such as SIP packet and H.225 (signaling protocol for performing call setting according to H.323 protocol), and a method for limiting the packet type according to a transport protocol used by the signaling protocol (for example, user datagram protocol (UDP), transmission control protocol (TCP), and stream control transmission protocol (SCTP)) can be applied.

The network processor 1704 waits for the transfer of the communication packet (step S2102), to determine whether the target packet has been transferred (step S2103).

When the target packet has not been transferred (NO at step S2103), the network processor 1704 waits for the transfer thereof (step S2102). When the target packet has been transferred (YES at step S2103), the network processor 1704 sends information of the target packet to the real-time communication detector 1701 (step S2104).

The real-time communication detector 1701 analyzes the packet sent from the network processor 1704 (step S2105), and determines whether the information relating to the real-time communication (real-time communication identifying information) is included therein (step S2106).

When the real-time communication identifying information is included therein (YES at step S2106), the real-time communication detector 1701 obtains the real-time communication identifying information and records it in the memory 110 or the like (step S2107). At the time of recording the real-time communication identifying information, the real-time communication detector 1701 stores the information in a format accessible from the arithmetic-mode determining unit 1702. Alternatively, the real-time communication detector 1701 can obtain the real-time communication identifying information in response to a request from the arithmetic-mode determining unit 1702 and pass the information on to the arithmetic-mode determining unit 1702. Further, the real-time communication identifying information can be passed on to the arithmetic-mode determining unit 1702 from the real-time communication detector 1701 and managed in the arithmetic-mode determining unit 1702.

When the real-time communication identifying information is not included in the sent packet (NO at step S2106), after the next packet is received, the real-time communication detector 1701 analyzes the packet to repeat the process (step S2105).

By repetitively performing the above process, the information for identifying the real-time communication executed by the communication apparatus 1700 can be extracted and recorded.

When the real-time communication identifying information is repetitively recorded, the information amount continues to increase. Therefore, the real-time communication detector 1701 can be configured to delete the recorded real-time communication identifying information by detecting termination of the real-time processing.

For example, when the tag value and the Call-ID are recorded, the real-time communication detector 1701 can delete the real-time communication identifying information agreeing with the tag value and the Call-ID included in the BYE message of the SIP, at the time of analyzing the BYE message. Accordingly, the unnecessary real-time communication identifying information can be deleted, thereby enabling to prevent an increase in the information amount to be stored.

Figure 22A:
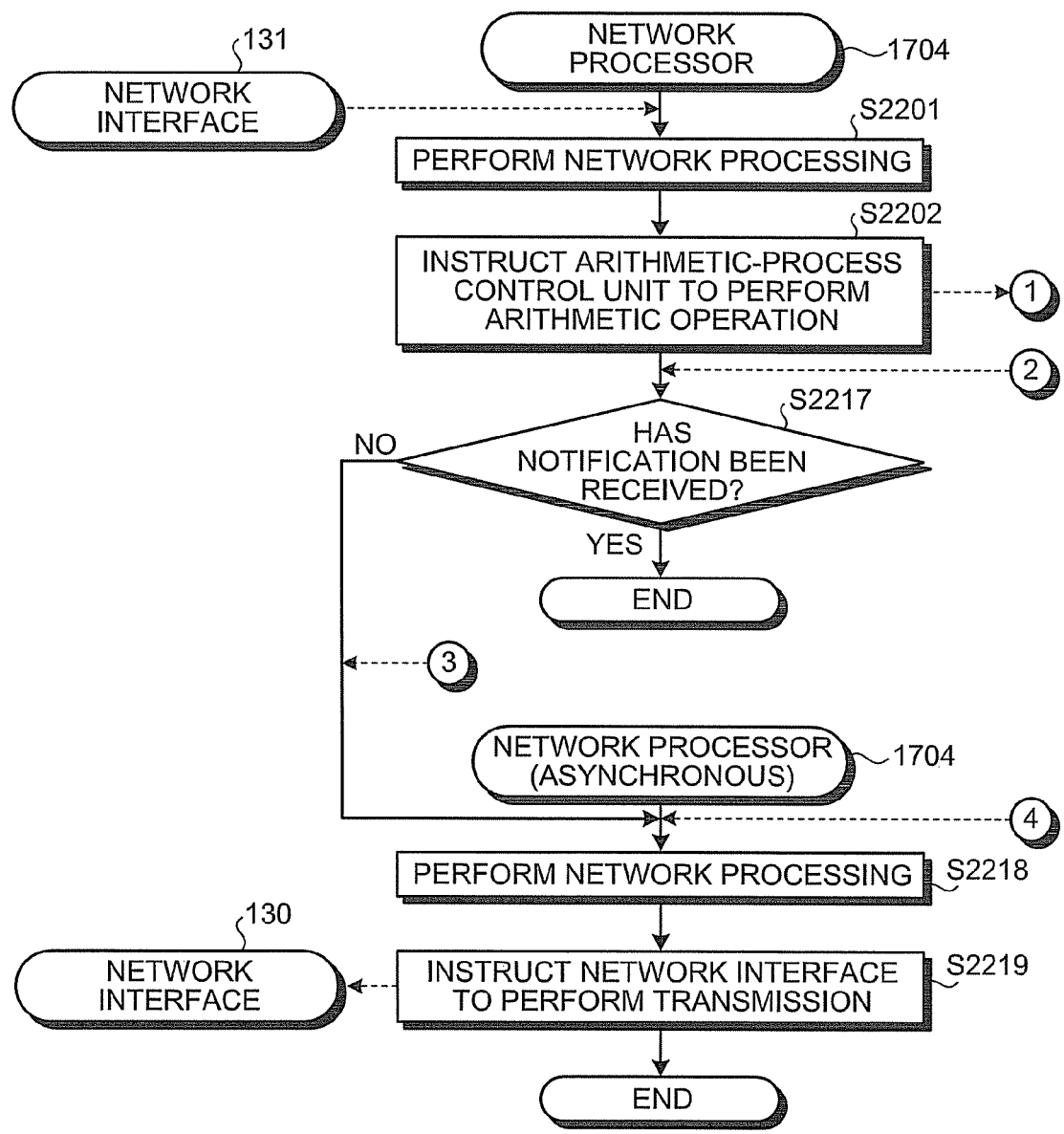
FIGS. 22A and 22B are flowcharts of an overall flow of communication processing in the third embodiment.
Figure 22B:
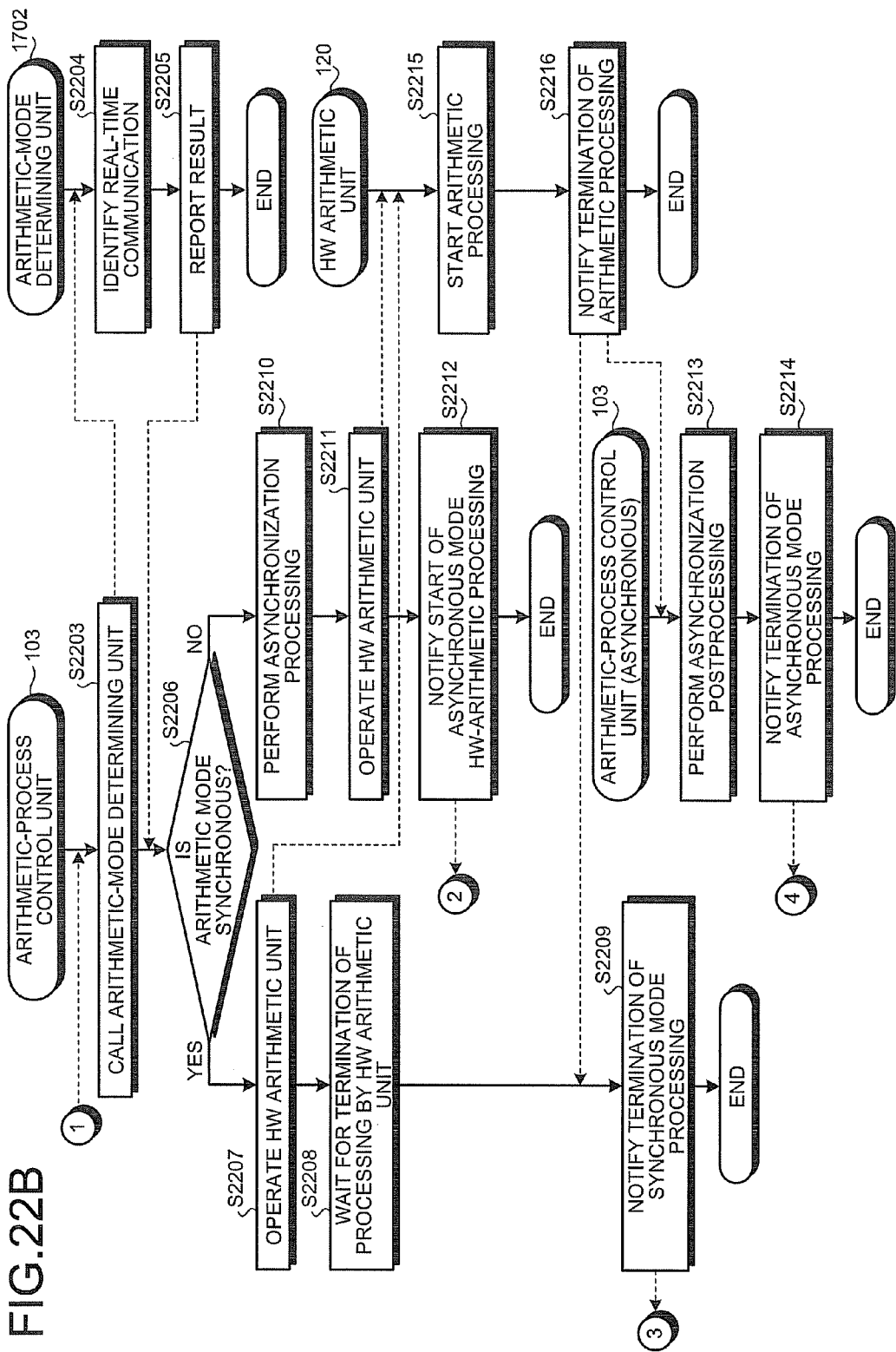

The communication processing in the third embodiment is explained with reference to FIGS. 22A and 22B.

As one example of the communication processing, a process at the time of performing the encryption processing as the IPsec protocol processing when the VoIP terminal device 1740 transmits a packet including voice data according to VoIP is explained.

In the first embodiment, the arithmetic-mode determining unit 102 determines the arithmetic mode by the comparison between the data size and the data size threshold value at step S804. On the other hand, in the third embodiment, the arithmetic-mode determining unit 1702 determines the arithmetic mode by using the real-time communication identification table to determine whether the communication is the real-time communication at step S2204.

Figure 8A:
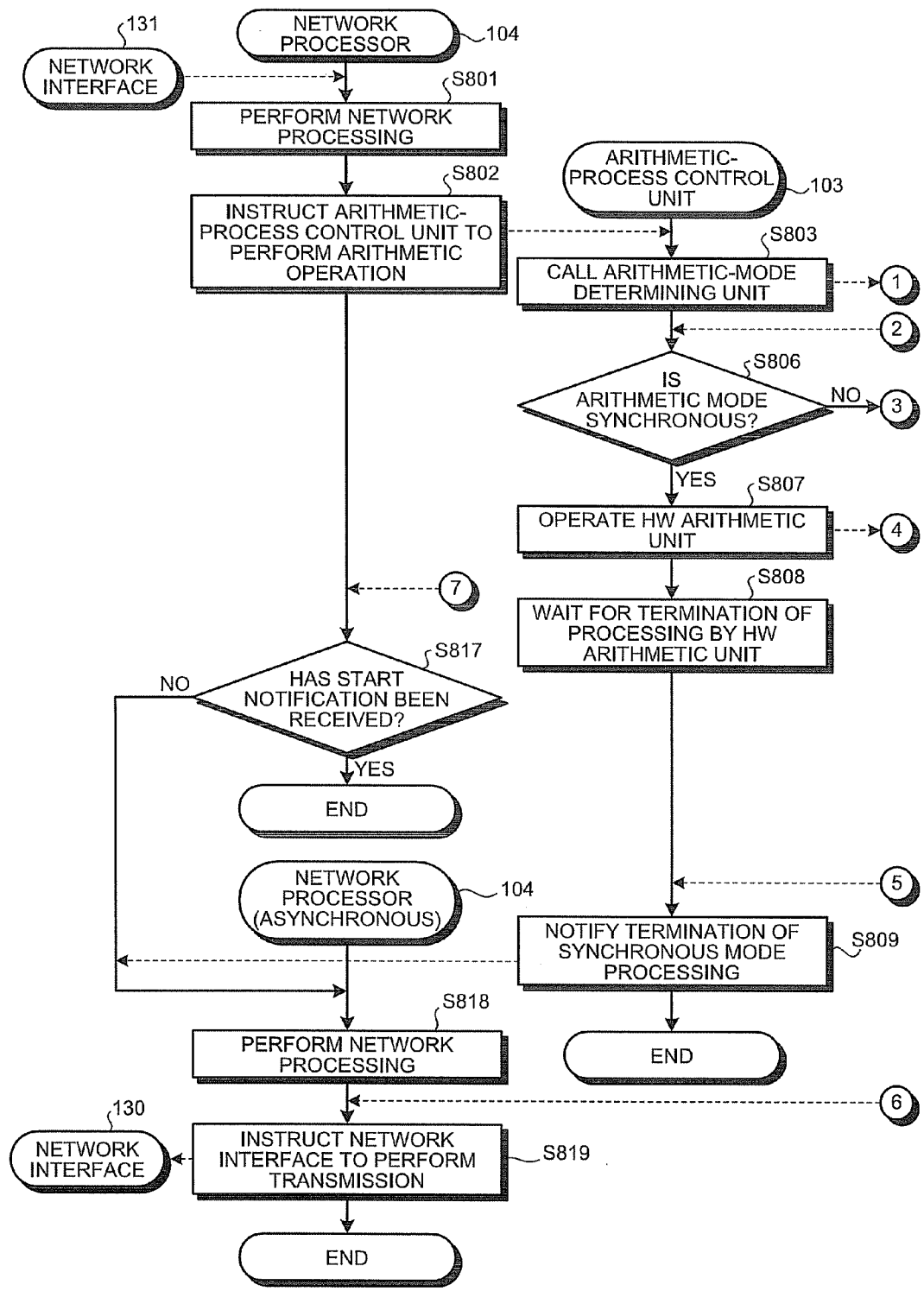
FIGS. 8A and 8B are flowcharts of an overall flow of communication processing in the first embodiment.
Figure 8B:
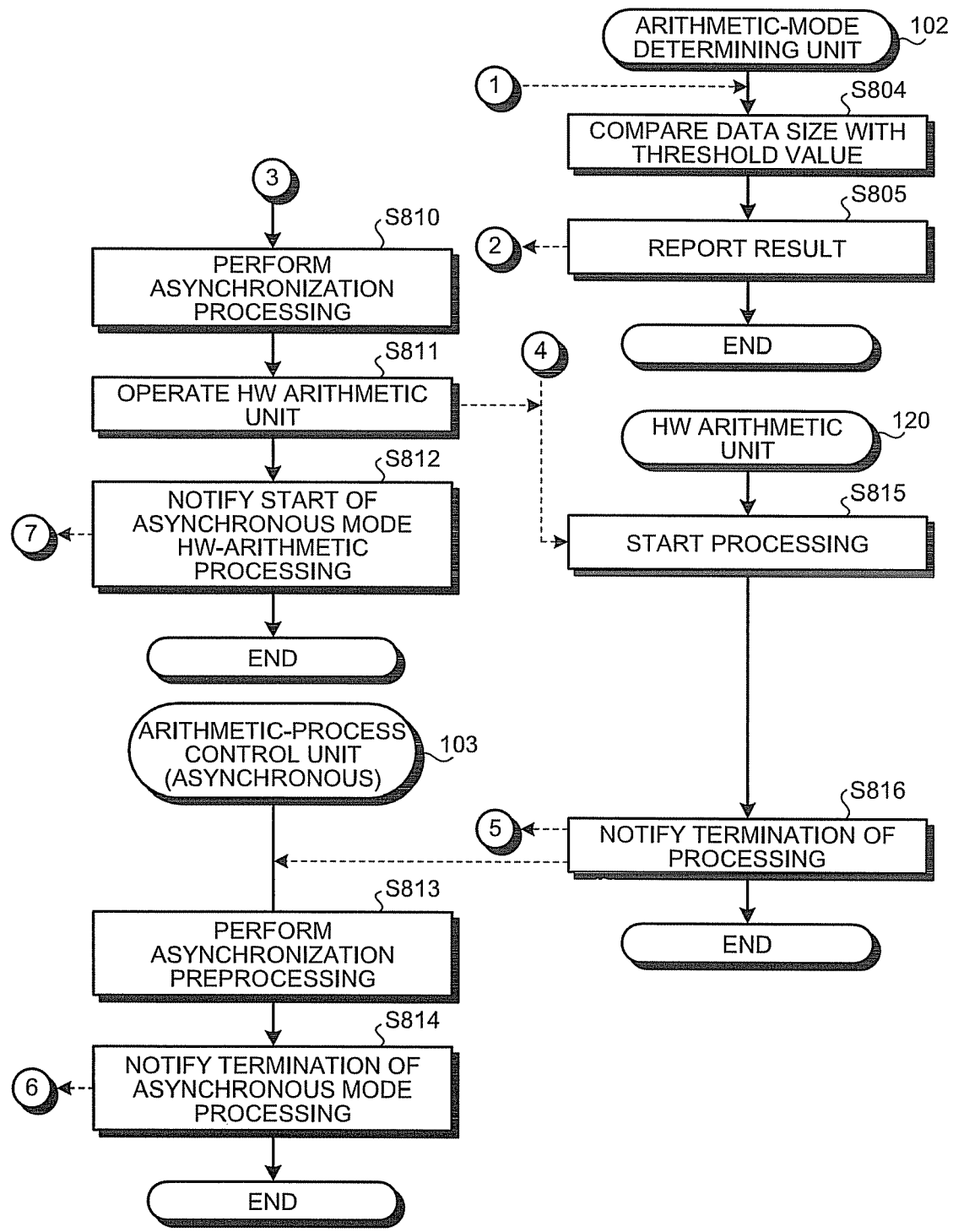

Other processes are the same as those in FIGS. 8A and 8B, which depicts the communication apparatus 100 according to the first embodiment, and therefore explanations thereof will be omitted. Details of step S2204 are explained below.

At step S2204, the arithmetic-mode determining unit 1702 collates the information in a header of the communication packet to be processed with the recorded real-time communication identifying information, to determine whether it is the real-time communication. When having determined that the communication is the real-time communication, the arithmetic-mode determining unit 1702 determines the synchronous mode as the arithmetic mode. Further, when having determined that the communication is not the real-time communication, the arithmetic-mode determining unit 1702 determines the asynchronous mode as the arithmetic mode.

For example, when the IP address and the port number included in the header agree with the real-time communication identifying information, the arithmetic-mode determining unit 1702 determines that the communication is the real-time communication, to thereby determine the synchronous mode as the arithmetic mode.

In the information processing apparatus according to the third embodiment, any one of the synchronous mode and the asynchronous mode can be adopted to perform the processing depending on whether the processing having requested the encryption processing is the real-time processing. Accordingly, for example, the synchronous mode can be selected for the processing requiring the real time performance, thereby enabling to reduce a delay or a jitter with respect to the processing requiring the real time performance.

In the third embodiment, an example in which the SIP is used for the signaling protocol is shown. However, even in the signaling protocol other than the SIP, such as H.323, the MGCP, or the MEGACO, the information for identifying the real-time communication packet is obtained, to thereby obtain the similar effect.

Further, installation can be appropriately changed according to the network environment to be embodied, regarding for which signaling protocol the real-time communication identifying information is to be obtained. In the third embodiment, detection of the real-time communication by the VoIP is explained as an example. However, the same method can be applied not only to the voice communication such as VoIP but also to video communication such as TV conference and video contents distribution.

In the third embodiment, the real-time communication detector 1701 detects the real-time communication identifying information beforehand and stores the information in the memory 110 or the like. On the other hand, the real-time communication identifying information obtained beforehand by an external device or the like can be stored in the memory 110 or the like, without performing the detection process of the real-time communication identifying information. In this case, the real-time communication detector 1701 is not required.

As a method of storing the information beforehand, any method such as a method of installing the information as a part of a software program for realizing the arithmetic-mode determining unit 1702 or a method in which a manager sets the information before execution by the information processing apparatus can be applied. Further, during the operation of the information processing apparatus, the manager can make changes such as addition, deletion, or modification of the real-time communication identifying information.

In the third embodiment, the communication processing is explained as an example; however, the same method can be applied when the arithmetic processing such as encryption/decryption and compression/expansion of data is performed for application other than communication. In the third embodiment, because the communication processing is not essential, the information processing apparatus can be configured such that the network interface is not mounted.

In the third embodiment, an example in which an application processor is used, which uses the HW arithmetic unit 120 instead of the network processor 1704 to perform a specific arithmetic processing, is explained. The application processor performs various application (hereinafter, "real-time application") processing in which the HW arithmetic unit 120 is used via the arithmetic-process control unit 103 to perform the arithmetic processing.

As an example of the real-time application, a motion-picture editing process for editing a motion picture interactively (non-linear editing), while performing compression or expansion of the motion picture, and a gaming process in which compression or expansion of the motion picture is performed can be mentioned as representative examples.

The arithmetic-mode determining unit 1702 in the first modification holds the criteria at the time of determining which of the synchronous mode and the asynchronous mode is to be selected and reference information predetermined for each real-time application, which is referred to at the time of determination.

The reference information is applied to the criteria and used for determining which of the synchronous mode and the asynchronous mode is to be selected, and is set according to the criterion to be adopted. For example, when processing delay time (allowable delay) is used as the criterion as one of processing loads allowed by the application, an allowable delay value predetermined for each application becomes the reference information. In this case, a threshold value of allowable delay for discriminating the synchronous mode and the asynchronous mode is predetermined as the criterion.

The reference information is set prior to the actual data processing, when the real-time application is installed or the real-time application performs initialization. The arithmetic-mode determining unit 1702 can be configured to analyze the processing content passed on from the application processor to the arithmetic-process control unit 103 to set the reference information. For example, when information of a required bit rate or the allowable delay information is included in the data to be compressed or expanded by the application, the bit rate or the allowable delay obtained from the processing content (data) can be stored.

Figures 23, 24:
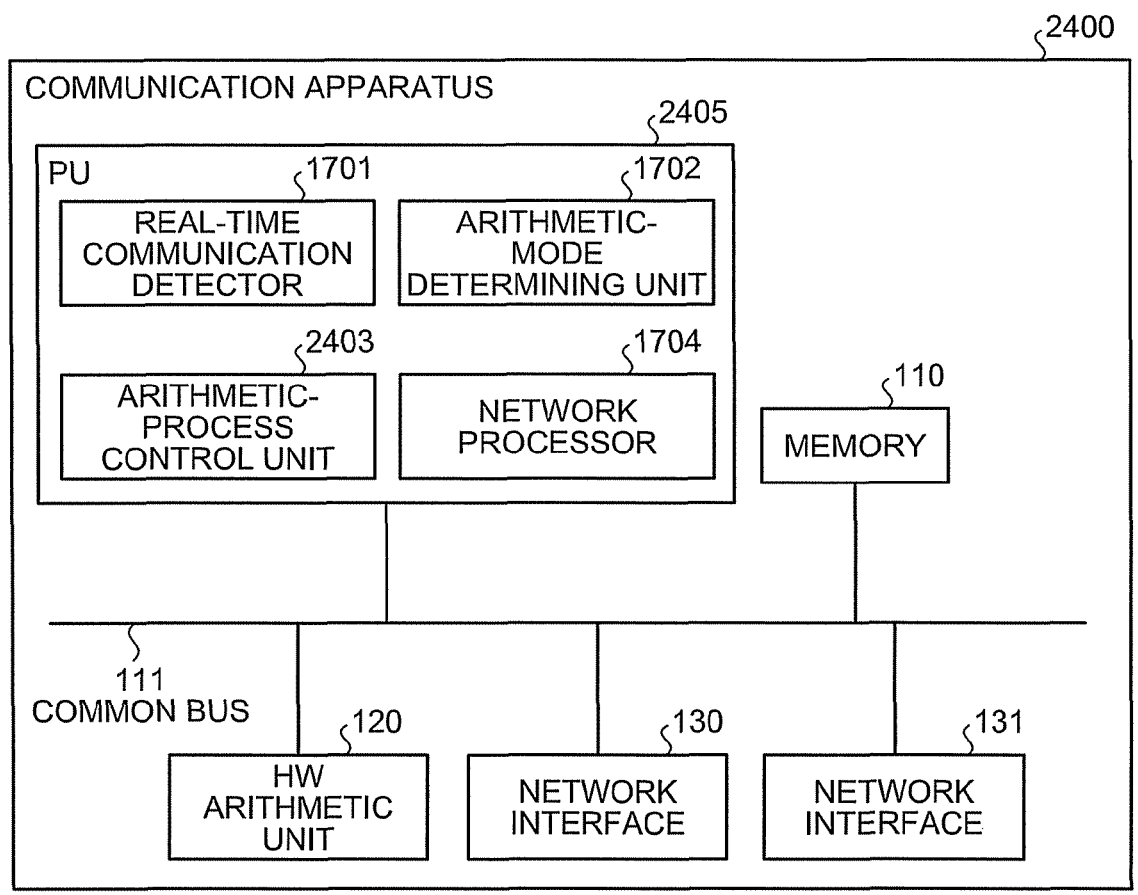
FIG. 23 is a schematic diagram for explaining one example of stored reference information.
FIG. 24 is a block diagram of a configuration of a communication apparatus according to a fourth embodiment of the present invention.

FIG. 23 is an example of the reference information when the motion-picture expansion process is divided into the synchronous mode and the asynchronous mode. For example, if the allowable delay threshold value is 1 s, with respect to the application of No. 1 in FIG. 23, the arithmetic-mode determining unit 1702 determines the asynchronous mode as the arithmetic mode, because the allowable delay (5 s) is larger than the threshold value (1 s). Further, with respect to the application of No. 2 in FIG. 23, because the allowable delay (100 ms) is smaller than the threshold value (1 s), the arithmetic-mode determining unit 1702 determines the synchronous mode as the arithmetic mode.

Thus, even for the application other than the communication processing, by referring to the information relating to the processing, it can be determined whether the processing is the real-time processing.

An information processing apparatus according to a fourth embodiment of the present invention executes processing by a synchronous mode prior to other processing by an asynchronous mode.

As shown in FIG. 24, a communication apparatus 2400 includes, as a main hardware configuration, a PU 2405, the HW arithmetic unit 120, the memory 110, the network interface 130, and the network interface 131.

As shown in FIG. 24, the PU 2405 includes the real-time communication detector 1701, the arithmetic-mode determining unit 1702, an arithmetic-process control unit 2403, and the network processor 1704.

In the fourth embodiment, the function of the arithmetic-process control unit 2403 is different from that in the third embodiment. Other configurations and functions are the same as those shown in FIG. 17, which is the block diagram of the configuration of the communication apparatus 1700 according to the third embodiment, and therefore like reference numerals refer to like parts, and explanations thereof will be omitted.

The arithmetic-process control unit 2403 is different from the arithmetic-process control unit 103 in the third embodiment in that a function of controlling to give priority to the arithmetic operation by the synchronous mode is added. Specifically, when the synchronous mode is adopted as the arithmetic mode performed by the HW arithmetic unit 120, the arithmetic-process control unit 2403 determines whether there is the arithmetic processing according to the asynchronous mode waiting for the processing. When there is the arithmetic processing according to the asynchronous mode waiting for the processing, the arithmetic-process control unit 2403 controls to execute the arithmetic processing according to the synchronous mode prior to the arithmetic processing according to the asynchronous mode.

Figure 25A:
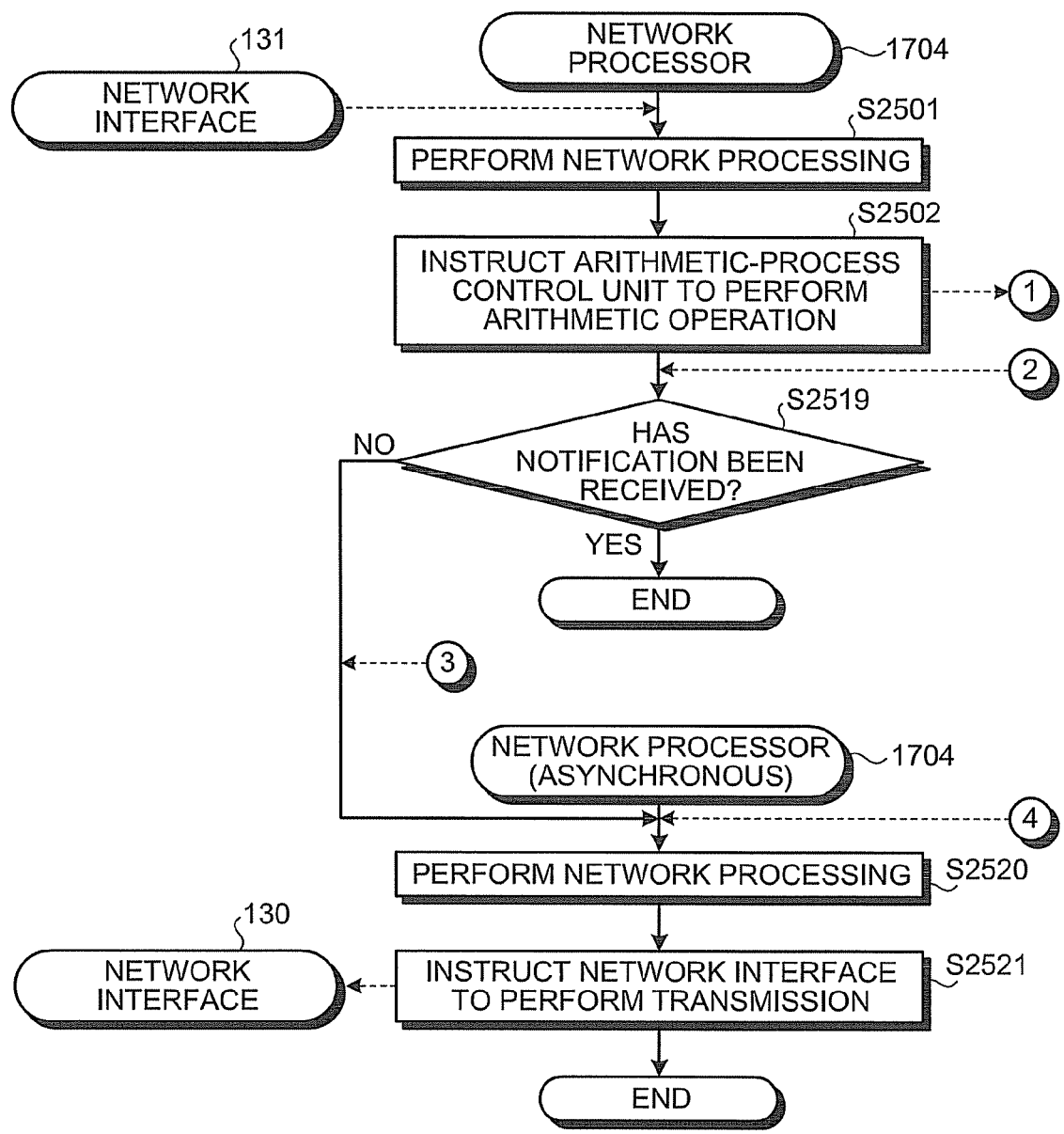
FIGS. 25A and 25B are flowcharts of an overall flow of communication processing in the fourth embodiment.
Figure 25B:
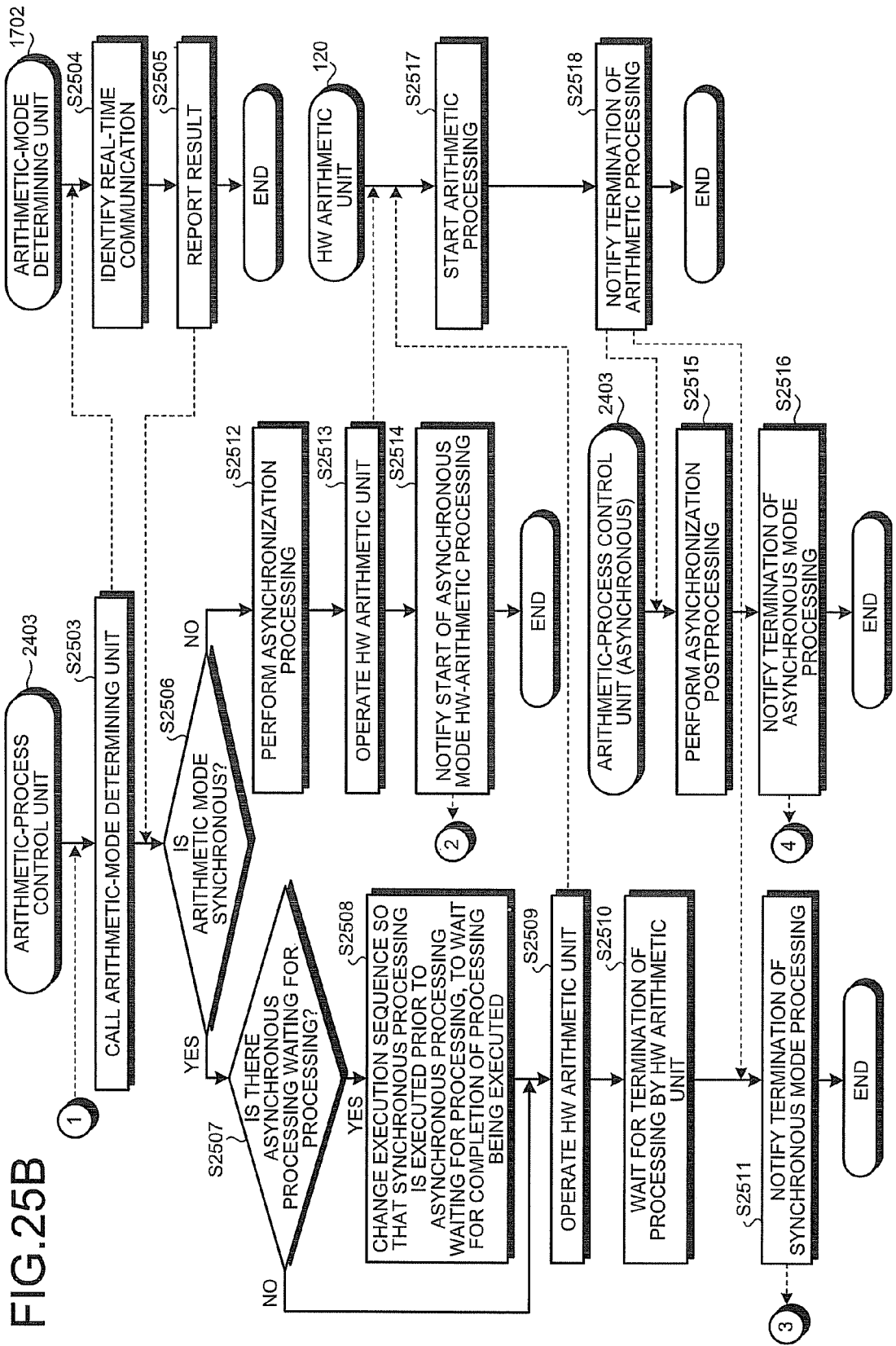

The communication processing in the fourth embodiment is explained with reference to FIGS. 25A and 25B.

The network processing, the arithmetic-operation instruction processing, and arithmetic-mode determination processing from step S2501 to step S2506 are the same as those from S2201 to step S2206 in the communication apparatus 1700 according to the third embodiment, and therefore explanations thereof will be omitted.

At step S2506, when it is determined that the arithmetic mode is the synchronous mode (YES at step S2506), the arithmetic-process control unit 2403 determines whether there is the asynchronous processing waiting for the processing (step S2507). When there is the asynchronous processing waiting for the processing (YES at step S2507), the arithmetic-process control unit 2403 changes an execution sequence so that the arithmetic processing according to the synchronous mode performed by the HW arithmetic unit 120 is executed prior to the asynchronous processing waiting for the processing, to wait for completion of the processing being executed (step S2508).

When there is the asynchronous processing waiting for the processing, the synchronous processing, for which the real time performance is required by the arithmetic-process control unit 2403, needs to wait until the asynchronous processing has all finished. Therefore, the arithmetic-process control unit 2403 changes the execution sequence so that synchronous processing is executed prior to the asynchronous processing waiting for the processing.

As a method of changing the execution sequence, a method in which when the synchronous processing or the asynchronous processing is scheduled in a time-sharing manner, the arithmetic-process control unit 2403 executes the synchronous mode prior to the asynchronous mode can be applied. When the HW arithmetic unit 120 or the arithmetic-process control unit 2403 has a queue of processing to be executed by the HW arithmetic unit 120, a method in which the arithmetic-process control unit 2403 changes the sequence of the queue so that the synchronous processing is executed first can be applied.

When there is no asynchronous processing waiting for the processing (NO at step S2507), or after the execution sequence has been changed, the arithmetic-process control unit 2403 indicates the processing content to the HW arithmetic unit 120, to start the encryption processing (step S2509).

Because the process from step S2510 to step S2521 is the same as that from step S2208 to step S2219 in the communication apparatus 1700 according to the third embodiment, explanations thereof will be omitted.

Thus, in the information processing apparatus according to the fourth embodiment, the processing according to the synchronous mode can be executed prior to other processing according to the asynchronous mode. Accordingly, a delay or a jitter with respect to the processing requiring the real time performance can be reduced.

An image processor according to a fifth embodiment of the present invention determines whether processing is real-time processing depending on a name or a type of an application, and adopts either a synchronous mode or an asynchronous mode based on a determination result, to perform the processing.

Figure 26:
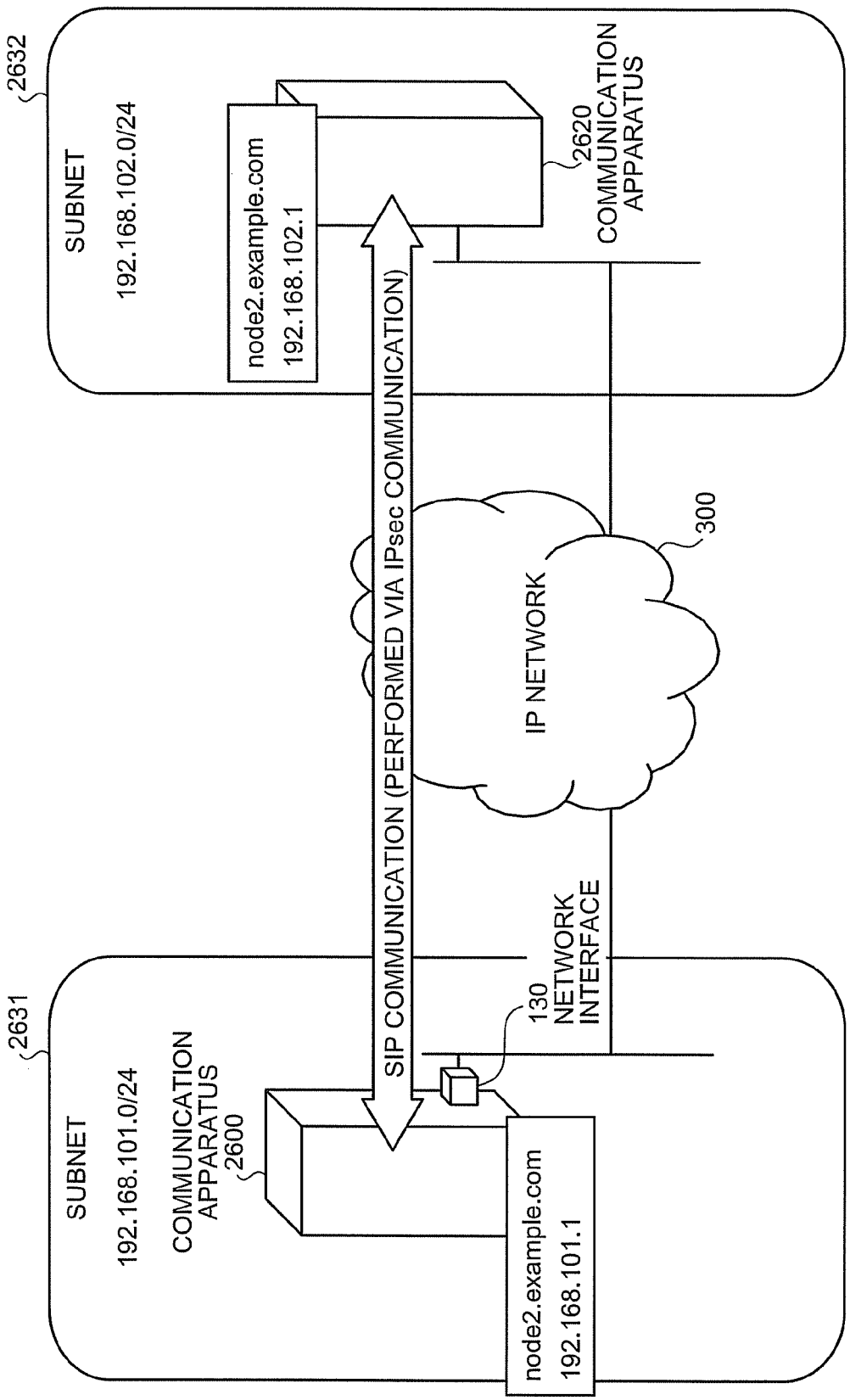
FIG. 26 is a network configuration diagram of a communication system according to a fifth embodiment of the present invention.

As shown in FIG. 26, in a communication mode in the fifth embodiment, a communication apparatus 2600 and a communication apparatus 2620 as a communication partner are connected with each other by the IP network 300. The communication apparatuses 2600 and 2620 are respectively connected to subnets 2631 and 2632.

The subnets 2631 and 2632 are connected by the IP network 300. The communication apparatus 2600 configured such that the communication apparatus 2600 and the communication apparatus 2620 can perform IP communication, respectively, performs real-time communication (for example, VoIP and video conference) and packet processing in connection with the IPsec protocol, and includes a function for executing the encryption processing or the like by the hardware. The communication apparatus 2620 communicates with the communication apparatus 2600 according to the IPsec protocol.

Figures 27, 28:
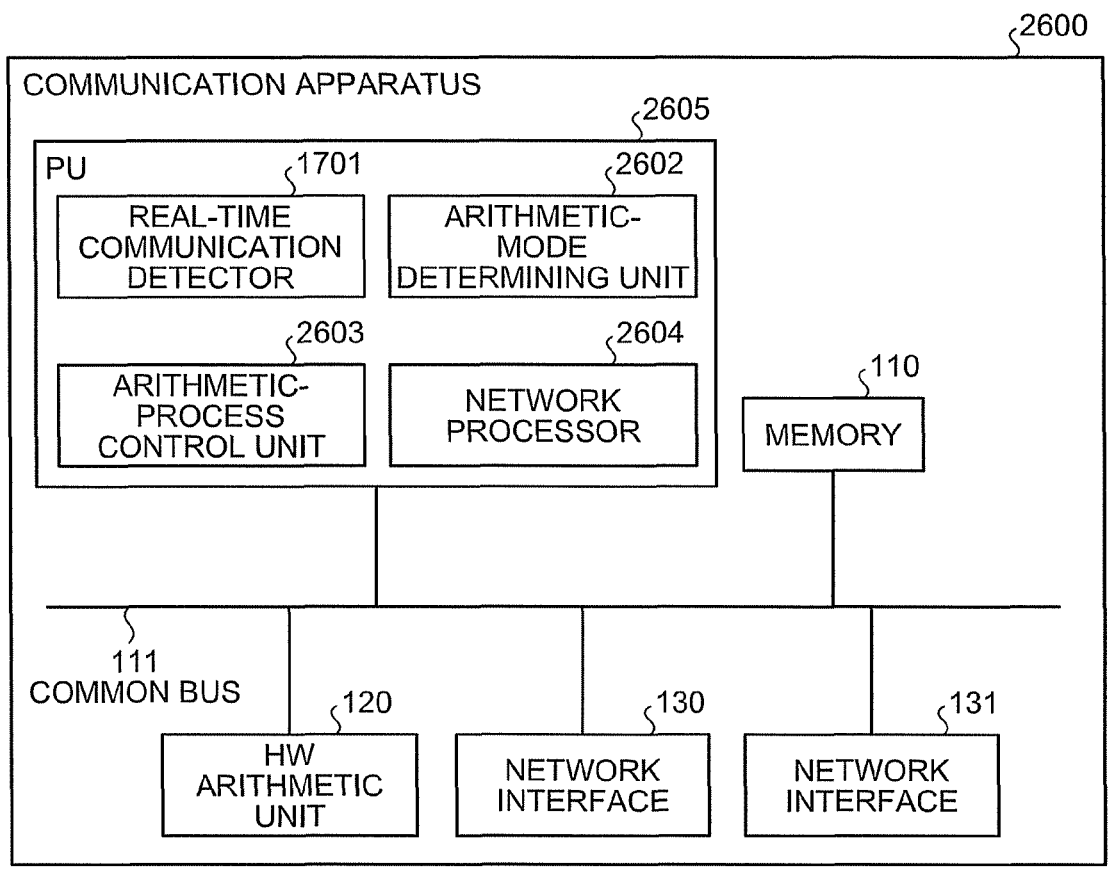
FIG. 27 is a block diagram of a configuration of a communication apparatus according to the fifth embodiment.
FIG. 28 is a schematic diagram for explaining one example of a real-time communication identification table according to the fifth embodiment.

A detailed configuration of the communication apparatus 2600 is explained next with reference to FIG. 27. As shown in FIG. 27, the communication apparatus 2600 includes, as the main hardware configuration, a PU 2605, the HW arithmetic unit 120, the memory 110, the network interface 130, and the network interface 131.

Further, as shown in FIG. 27, the PU 2605 includes the real-time communication detector 1701, an arithmetic-mode determining unit 2602, an arithmetic-process control unit 2603, and a network processor 2604.

In the fifth embodiment, the functions of the arithmetic-mode determining unit 2602, the arithmetic-process control unit 2603, and the network processor 2604 are different from those in the third embodiment. Other configurations and functions are the same as those shown in FIG. 17, which is the block diagram of the configuration of the communication apparatus 1700 according to the third embodiment, and therefore like reference numerals refer to like parts, and explanations thereof will be omitted.

In FIG. 28, only an application name is described as the application information for identifying the individual application; however, the application can be described in other formats capable of identifying the application. For example, the other formats can be an identifier for specifying an execution file of the application by a storage device in which the application is stored, and a hash value calculated with respect to the execution file of the application. In the real-time communication identification table, the communication information such as protocol and address can be managed together as in the third embodiment.

The network processor 2604 uses the arithmetic-process control unit 2603, as in the network processor 104 in the first embodiment, to make the HW arithmetic unit 120 execute a part or all of the processing. In the fifth embodiment, the network processor 2604 also has a function for extracting the information for identifying the application now executing the communication (hereinafter, "application information") from the information relating to the received packet.

It is different from the arithmetic-process control unit 103 according to the third embodiment that the arithmetic-process control unit 2603 controls the arithmetic-mode determining unit 2602 to execute determination of the arithmetic mode by notifying the arithmetic-mode determining unit 2602 of the application information extracted by the network processor 2604.

The arithmetic-mode determining unit 2602 compares the real-time communication identifying information, in which the information of the application that performs the real-time communication is contained, with the application information extracted by the network processor 2604, to determine either the synchronous mode or the asynchronous mode as the arithmetic mode.

Figure 29A:
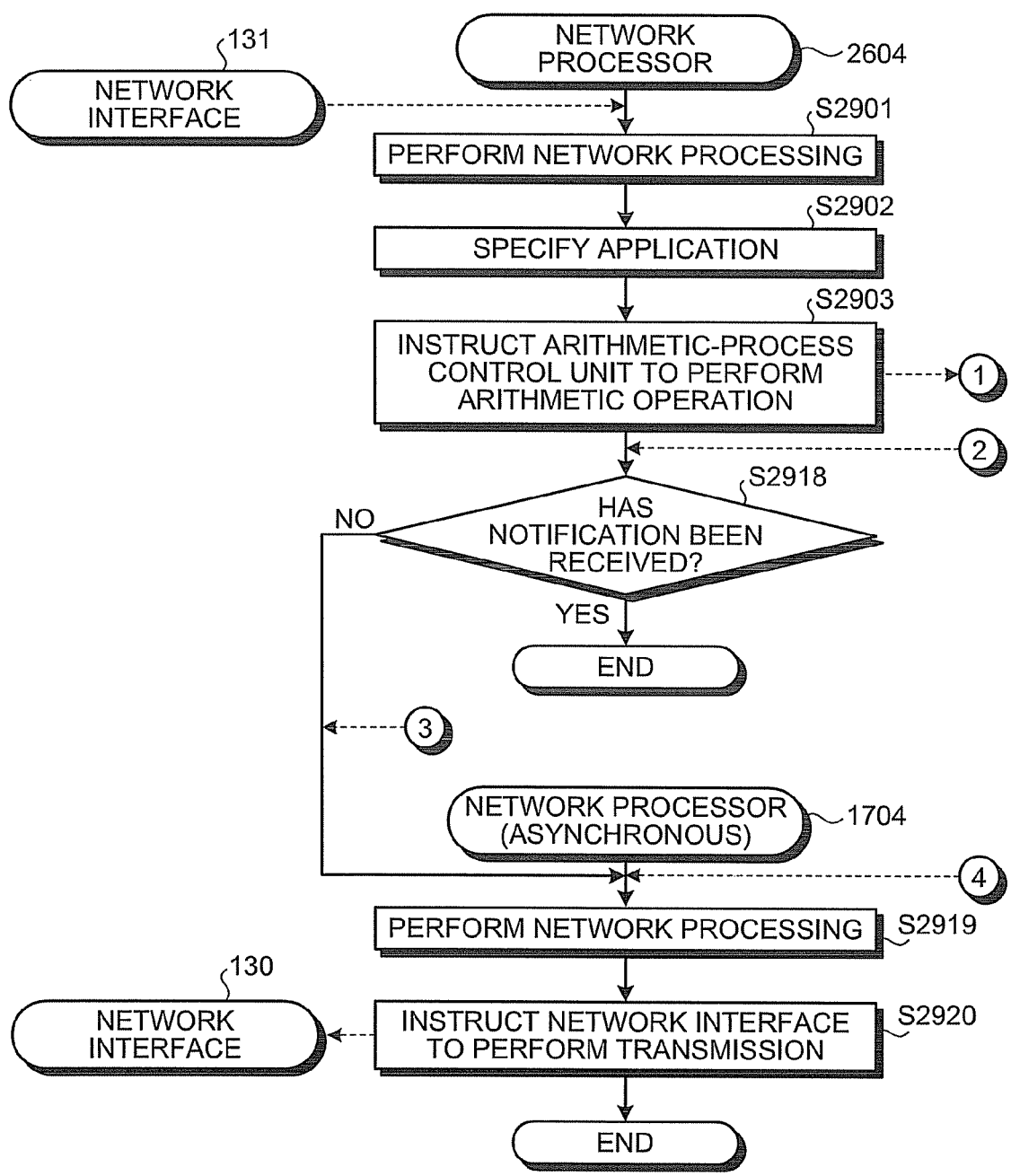
FIGS. 29A and 29B are flowcharts of an overall flow of communication processing in the fifth embodiment.
Figure 29B:
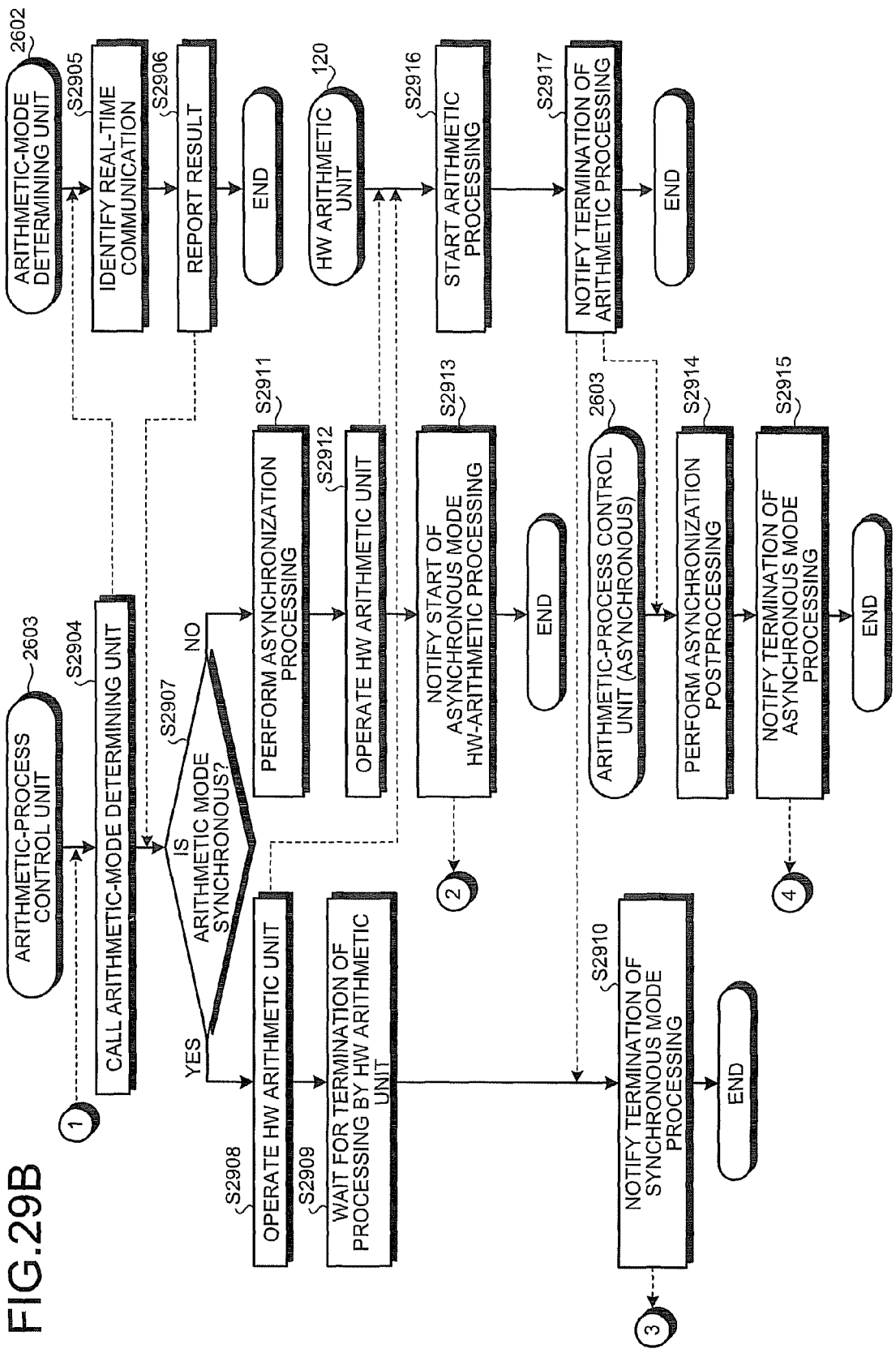

The communication processing in the fifth embodiment is explained with reference to FIGS. 29A and 29B.

The network processor 2604 first performs the network processing such as analysis of the header of the received packet or the IPsec protocol processing (step S2901). The network processor 2604 identifies the network application involved with the communication (step S2902). In the case of an operating system (OS) mounted with a socket application programming interface (API) such as Linux$^{(registered\ trademark)}$, the processing can be realized according to a method of extracting the application information that has opened the socket from information attached to the socket involved with the communication.

The network processor 2604 then notifies the arithmetic-process control unit 2603 of the extracted application information, together with the information required for arithmetic operation of the packet (step S2903). The arithmetic-process control unit 2603 notifies the arithmetic-mode determining unit 2602 of the application information to request determination whether it corresponds to the application subjected to the synchronous processing (step S2904).

The arithmetic-mode determining unit 2602 searches for an entry having the information agreeing with the notified application information among entries in the real-time communication identification table, to identify whether it is the real-time communication, to thereby determine the arithmetic mode (step S2905). Specifically, when there is the agreed entry, the arithmetic-mode determining unit 2602 determines the synchronous mode as the arithmetic mode. When there is no agreed entry, the arithmetic-mode determining unit 2602 determines the asynchronous mode as the arithmetic mode.

When the communication information such as the protocol and the address is stored together with the application information in the real-time communication identification table, the entry is also collated with these pieces of information, to determine either the synchronous mode or the asynchronous mode.

Because the process from steps S2906 to S2920 is the same as that from steps S2205 to S2219 in the communication apparatus 1700 according to the third embodiment, explanations thereof will be omitted.

In the information processing apparatus according to the fifth embodiment, either the synchronous mode or the asynchronous mode is adopted to perform the processing, according to the name or the type of the application. Accordingly, a delay or fluctuation with respect to the process requiring the real time performance can be decreased.

Figure 30:
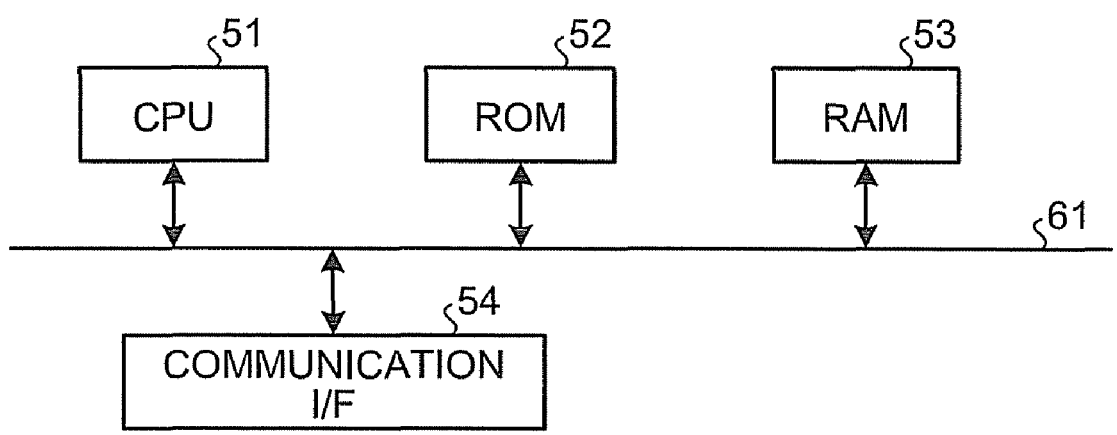
FIG. 30 is a schematic diagram for explaining a hardware configuration of an information processing apparatus according to the first to fifth embodiments.

A hardware configuration of the information processing apparatus according to the first to fifth embodiments is explained next with reference to FIG. 30.

The information processing apparatus according to the first to fifth embodiments includes a control unit such as a central processing unit (CPU) 51, a storage unit such as a read only memory (ROM) 52 or a RAM 53, a communication interface (I/F) 54 that connects to the network to perform communication, an external storage unit such as an HDD or a compact disk (CD) drive, a display unit such as a display device, an input unit such as a key board and a mouse, and a bus 61 that connects the respective parts with each other, which is a hardware configuration using a normal computer.

An information processing program executed by the information processing apparatus according to the first to fifth embodiments is recorded on a computer readable recording medium such as a compact disk read only memory (CD-ROM), a flexible disk (FD), a compact disk recordable (CD-R), and a digital versatile disk (DVD) and provided in an installable format or executable format file.

The information processing program executed by the information processing apparatus according to the first to fifth embodiments can be stored on the computer connected to a network such as the Internet and downloaded via the network. The information processing program executed by the information processing apparatus according to the first to fifth embodiments can be also provided or distributed via a network such as the Internet.

The information processing program in the first to fifth embodiments can be incorporated in the ROM or the like and to be provided.

The information processing program executed by the information processing apparatus according to the first to fifth embodiments has a module configuration including the respective parts (data-size threshold calculator, arithmetic-mode determining unit, arithmetic-process control unit, and network processor). As the actual hardware, because the CPU 51 (processor) reads the information processing program from the recording medium and executes the program, the respective parts are loaded on the storage unit and generated on a main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information processing apparatus comprising:
an arithmetic circuit that executes a predetermined arithmetic operation;
a determining unit that compares a data size of data to be processed with a predetermined first threshold value, and determines one of a synchronous mode and an asynchronous mode as an execution mode when the data size is larger than the first threshold value, and the other as the execution mode when the data size is not larger than the first threshold value, the synchronous mode executing the processing after waiting for completion of the arithmetic operation by the arithmetic circuit, and the asynchronous mode executing the processing without waiting for completion of the arithmetic operation by the arithmetic circuit;
a control unit that controls the arithmetic operation performed by the arithmetic circuit according to the execution mode determined by the determining unit; and
a threshold value calculating unit that determines processing loads of the processing on the data of a plurality of data sizes for each of the synchronous mode and the asynchronous mode and calculates the first threshold value by using first data and second data, the first data being weighted data of data on one side of a node where a first line and a second line cross, the second data being weighted data of data on another side of the node, the first line being a line connecting the processing loads of the processing in the synchronous mode, the second line being a line connecting the processing loads of the processing in the asynchronous mode.

2. The apparatus according to claim 1, further comprising a software arithmetic unit that executes the arithmetic operation by a software, wherein
the determining unit compares the data size with a predetermined second threshold value, and determines one of a software mode that executes the arithmetic operation by the software arithmetic unit and a hardware mode that executes the arithmetic operation by the arithmetic circuit as the execution mode when the data size is larger than the second threshold value, and the other as the execution mode when the data size is not larger than the second threshold value, and
the control unit performs control such that the software arithmetic unit executes the arithmetic operation when the software mode is determined as the execution mode.

3. An information processing method comprising:
comparing a data size of data to be processed with a predetermined first threshold value and determining one of a synchronous mode and an asynchronous mode as an execution mode of a predetermined arithmetic operation to be executed by an arithmetic circuit when the data size is larger than the first threshold value, and the other as the execution mode when the data size is not larger than the first threshold value, the synchronous mode executing the processing after waiting for completion of the arithmetic operation by the arithmetic circuit, and the asynchronous mode executing the processing without waiting for completion of the arithmetic operation by the arithmetic circuit;
controlling the arithmetic operation performed by the arithmetic circuit according to the determined execution mode; and
determining processing loads of the processing on the data of a plurality of data sizes for each of the synchronous mode and the asynchronous mode and calculating the first threshold value by using first data and second data, the first data being weighted data of data on one side of a node where a first line and a second line cross, the second data being weighted data of data on another side of the node, the first line being a line connecting the processing loads of the processing in the synchronous mode, the second line being a line connecting the processing loads of the processing in the asynchronous mode.

4. A computer program product having a non-transitory computer readable medium including programmed instructions for processing information, wherein the instructions, when executed by a computer, cause the computer to perform:
comparing a data size of data to be processed with a predetermined first threshold value and determining one of a synchronous mode and an asynchronous mode as an execution mode of a predetermined arithmetic operation to be executed by an arithmetic circuit when the data size is larger than the first threshold value, and the other as the execution mode when the data size is not larger than the first threshold value, the synchronous mode executing the processing after waiting for completion of the arithmetic operation by the arithmetic circuit, and the asynchronous mode executing the processing without waiting for completion of the arithmetic operation by the arithmetic circuit;
controlling the arithmetic operation performed by the arithmetic circuit according to the determined execution mode; and
determining processing loads of the processing on the data of a plurality of data sizes for each of the synchronous mode and the asynchronous mode and calculating the first threshold value by using first data and second data, the first data being weighted data of data on one side of a node where a first line and a second line cross, the second data being weighted data of data on another side of the node, the first line being a line connecting the processing loads of the processing in the synchronous mode, the second line being a line connecting the processing loads of the processing in the asynchronous mode.

* * * * *